(12) United States Patent
Kondo

(10) Patent No.: US 8,116,576 B2
(45) Date of Patent: Feb. 14, 2012

(54) IMAGE PROCESSING METHOD AND IMAGE PROCESSING DEVICE FOR RECONSTRUCTING A HIGH-RESOLUTION PICTURE FROM A CAPTURED LOW-RESOLUTION PICTURE

(75) Inventor: Satoshi Kondo, Kyoto (JP)

(73) Assignee: Panasonic Corporation, Osaka (JP)

( * ) Notice: Subject to any disclaimer, the term of this patent is extended or adjusted under 35 U.S.C. 154(b) by 1383 days.

(21) Appl. No.: 11/712,947

(22) Filed: Mar. 2, 2007

(65) Prior Publication Data
US 2007/0206678 A1 Sep. 6, 2007

(30) Foreign Application Priority Data

Mar. 3, 2006 (JP) .................................. 2006-057401

(51) Int. Cl.
| | |
|---|---|
| G06K 9/00 | (2006.01) |
| G06K 9/36 | (2006.01) |
| G06K 9/32 | (2006.01) |
| G09G 5/00 | (2006.01) |
| H04N 7/18 | (2006.01) |
| H04N 11/02 | (2006.01) |
| H04N 11/04 | (2006.01) |
| H04N 7/12 | (2006.01) |
| H04N 9/74 | (2006.01) |

(52) U.S. Cl. ......... 382/236; 382/107; 382/284; 382/286; 382/294; 382/299; 345/619; 348/154; 348/400.1; 348/584

(58) Field of Classification Search ......................... None
See application file for complete search history.

(56) References Cited

U.S. PATENT DOCUMENTS

| | | | | |
|---|---|---|---|---|
| 6,191,820 B1 * | 2/2001 | Kang et al. | ..................... | 348/445 |
| 6,847,405 B2 * | 1/2005 | Hsu et al. | ..................... | 348/452 |
| 7,327,494 B2 | 2/2008 | Aiso | | |

(Continued)

FOREIGN PATENT DOCUMENTS

JP 2004-234623 8/2004

(Continued)

OTHER PUBLICATIONS

S.C. Park, M.K. Park and M.G. Kang, "Super-Resolution Image Reconstruction", A Technical Overview, IEEE Signal Processing Magazine, May 2003.

*Primary Examiner* — Randolph I Chu

(74) *Attorney, Agent, or Firm* — Wenderoth, Lind & Ponack, L.L.P.

(57) ABSTRACT

The present invention provides an image processing device which is able to reconstruct a high-resolution (HR) picture from low-resolution (LR) pictures, by modifying instability in the pictures due to movement of hands in capturing the images, and also by preventing increase of a circuit size and processing amounts required for motion estimation between the pictures.

In the image processing device, a motion estimation unit reads the LR pictures from a memory, and estimates respective motion vectors between the pictures. A stabilization parameter calculation unit calculates a stabilized global motion parameter based on the motion vector. A motion vector compensation unit stabilizes the motion vectors calculated by the motion estimation unit, using the stabilized global motion parameter. A picture integration unit combines (integrates) a target picture and reference pictures with sub-pixel precision, using the stabilized motion vectors. An integrated picture processing unit generates equally-spaced pixels of a HR picture from unequally-spaced pixels of the integrated picture, and outputs the generated HR picture.

8 Claims, 17 Drawing Sheets

U.S. PATENT DOCUMENTS

| | | | |
|---|---|---|---|
| 7,336,838 B2 * | 2/2008 | Hur et al. | 382/236 |
| 7,551,673 B1 * | 6/2009 | Oh et al. | 375/240.16 |
| 7,564,902 B2 * | 7/2009 | Sasai et al. | 375/240.26 |
| 2004/0161038 A1 * | 8/2004 | Yamada | 375/240.16 |
| 2004/0196376 A1 | 10/2004 | Hosoda et al. | |
| 2004/0197075 A1 * | 10/2004 | Aiso | 386/46 |
| 2006/0061658 A1 * | 3/2006 | Faulkner et al. | 348/207.1 |
| 2010/0208084 A1 * | 8/2010 | Pinto et al. | 348/207.1 |

FOREIGN PATENT DOCUMENTS

| | | |
|---|---|---|
| JP | 2005-130159 | 5/2005 |

* cited by examiner

IMAGE PROCESSING METHOD AND IMAGE PROCESSING DEVICE FOR RECONSTRUCTING A HIGH-RESOLUTION PICTURE FROM A CAPTURED LOW-RESOLUTION PICTURE

BACKGROUND OF THE INVENTION (1) Field of the Invention

The present invention relates to an image processing method and an image processing device, and more particularly to a technology of reconstructing a high-resolution picture from captured low-resolution pictures.

(2) Description of the Related Art

In recent years, digital video cameras have been widely used to capture images in daily life. However, in the capturing, hands cannot hold the cameras still so that the captured images often have degraded quality. There are two types of methods for modifying (hereinafter, referred to also as "stabilization" or "modifying instability") the instability of the camera capturing: an optical method using known mechanical processing; and an electronic method using electrical processing. Since the optical method has disadvantages of difficulty in miniaturization and cost reduction, the electronic method is often utilized. One conventional electronic stabilization method is disclosed in Japanese Patent Application Publication No. 2005-130159, for example. In this conventional method, deviation (hereinafter, referred to also as "motion" or a "motion vector") between temporally neighbor pictures is calculated to detect an in-stabilized component, and each pixel in a target picture is modified by eliminating the in-stabilized component. In short, by shifting the entire target picture with the motion vector, the instability is modified.

However, in general cameras, resolution of images outputted from imaging sensors is low, and a target picture for which instability is to be modified is often out of focus. Therefore, a problem is that, even if instability of the target picture is modified, the resulting picture turns out to still have low resolution failing to enhance the resolution. Furthermore, if image modification, such as affine transformation, is performed for the stabilization of image signals, it is necessary to obtain pixel values using linear interpolation. Thereby, another problem is that the images stabilized in the above manner turn out to be blurred. Still further, when pixels whose values are obtained by the linear interpolation and pixel whose values are not obtained by the linear interpolation are mixed spatially and temporally, the resulting pixels are a mix of blurred pixels and not-blurred pixels. This causes still another problem of subjective degradation of the image quality. Here, the linear interpolation processing is not performed when the stabilization is processed in units of integer-numbered pixels. On the other hand, the linear interpolation processing is performed when the stabilization is processed not in units of integer-numbered pixels, in other words, processed in units each of which is smaller than one pixel (with sub-pixel precision).

In the meantime, another image processing method, a so-called super-resolution image processing method, has recently been proposed in, for example, "Super-Resolution Image Reconstruction: A Technical Overview", S. C. Park, M. K. Park, and M. G. Kang, "IEEE Signal Processing Magazine", May 2003. In this super-resolution image processing method, a sequence of pictures included in low-resolution video is integrated to reconstruct a high-resolution picture.

In more detail, each deviation amount (motion amount) between low-resolution pictures is detected with sub-pixel precision. Then, according to the deviation amount, the integration of the low-resolution pictures are executed.

Here, it is conceivable that such super-resolution image processing is performed after stabilization. That is, there is a case where pixels in a picture is applied with both of the above-explained stabilization processing and this super-resolution image processing, in other words, where a high-resolution picture is generated after stabilizing image signals in the low-resolution pictures.

In such a case, however, it is necessary to calculate respective overlapping deviation amounts between pictures, for both of the stabilization processing and the super-resolution image processing, which results in still another problem of increase of a processing amount and a circuit size.

SUMMARY OF THE INVENTION

In order to solve the above problems, an object of the present invention is to provide an image processing method and an image processing device, which make it possible to modify instability of pictures and also to reconstruct a high-resolution picture from low-resolution pictures, while preventing increase of a processing amount and a circuit size due to motion estimation between pictures.

In order to solve the above problems, the image processing method according to the present invention generates an integrated picture corresponding to a target picture, using the target picture and a plurality of reference pictures, the target picture being one of a plurality of pictures which are sequentially inputted every predetermined period, and the reference pictures being included in the sequentially inputted pictures and being temporally positioned prior or subsequent to the target picture. The image processing method includes: estimating a motion amount between a segment of the target picture and a segment of each of the reference pictures with sub-pixel precision; calculating an in-stabilized variant component using at least a part of the estimated motion amounts; integrating pixels of the target picture and pixels of the reference pictures onto a space for the integrated picture, so that resolution of the target picture is increased and instability of the target picture is modified, based on the estimated motion amounts and the calculated in-stabilized variant component; and generating, from the pixels of the space, the integrated picture that has pixels whose number is determined using one of a magnification ratio and a predetermined number of pixels, and which are positioned equally spaced apart.

Thereby, motion estimation between pictures is required only once, so that it is possible to modify instability of pictures and also to reconstruct a high-resolution picture from low-resolution pictures, while preventing increase of a processing amount and a circuit size due to motion estimation between pictures.

Furthermore, the image processing method may further includes: calculating a stabilized motion amount for the target picture, based on the in-stabilized variant component; and calculating respective stabilized motion amounts for the respective reference pictures, based on the motion amounts and the in-stabilized variant component; wherein the integrating includes: mapping the pixels of the reference pictures onto the space, after shifting the pixels based on the stabilized motion amounts of the reference pictures; and mapping the pixels of the target picture onto the space, after shifting the pixels based on the stabilized motion amount of the target picture.

Thereby, it is possible to realize the stabilization with high accuracy, and also to generate a high-resolution picture in which aliasing in low-resolution pictures are restored.

Still further, the calculating of the in-stabilized variant component may include: calculating a global motion parameter which represents dominant motion in the whole target picture; and calculating the in-stabilized variant component, based on a history of the global motion parameter.

Thereby, it is possible to generate in-stabilized variant components with high accuracy.

Still further, the integrating may include: mapping (i) the pixels of the reference pictures onto the space after shifting the pixels based on the motion amounts, and (ii) the pixels of the target picture onto the space without shifting the pixels; and modifying positions of the pixels mapped on the space, using the in-stabilized variant component.

Thereby, it is possible to realize the stabilization with high accuracy, and also to generate a high-resolution picture in which aliasing in low-resolution pictures are restored.

Still further, the calculating of the in-stabilized variant component may include: calculating a global motion parameter which represents dominant motion in the whole target picture; and calculating the in-stabilized variant component, based on a history of the global motion parameter.

Thereby, it is possible to generate in-stabilized variant components with high accuracy.

Still further, the magnification ratio or the predetermined number of pixels may be designated from the outside.

Still further, the magnification ratio or the predetermined number may be designated, so that the number of pixels of the integrated picture becomes equal to the number of pixels of the input pictures.

Still further, the image processing method may further include designating a predetermined maximum value of an amount of the shifting, wherein, in the calculating of the in-stabilized variant component, the in-stabilized variant component is calculated so that the amount of the shifting of the pixels do not exceed the maximum value, and in the integrating, the magnification ratio is determined based on the number of pixels of the input pictures and the maximum value.

It should be noted that the present invention is able to be realized not only as the above-described image processing method, but also as: an image processing device having units which perform the characterized processing in the image processing method; a computer program product which, when loaded into a computer, allows the computer to execute the characterized processing; a large-scale integration (LSI) in which the units of the image processing device are integrated; a camera in which the image processing device is embedded; an picture reproduction apparatus in which the image processing device is embedded; and the like. It goes without saying that the above program product is able to be distributed via a recording medium, such as a CD-ROM, or a transmitting medium, such as the Internet.

Accordingly, by using the image processing method of the present invention, motion estimation between pictures is required only once, so that it is possible to modify instability of pictures and also to reconstruct a high-resolution picture from low-resolution pictures, while preventing increase of a processing amount and a circuit size due to motion estimation between pictures. Therefore, the present invention is highly suitable for practical uses these days when digital video cameras have been widely used to capture images in daily life.

FURTHER INFORMATION ABOUT TECHNICAL BACKGROUND TO THIS APPLICATION

The disclosure of Japanese Patent Application No. 2006-57401 filed on Mar. 3, 2006 including specification, drawings and claims is incorporated herein by reference in its entirety.

BRIEF DESCRIPTION OF THE DRAWINGS

These and other objects, advantages and features of the present invention will become apparent from the following description thereof taken in conjunction with the accompanying drawings which illustrate specific embodiments of the present invention. In the Drawings.

DESCRIPTION OF THE PREFERRED EMBODIMENT(S)

The following describes the embodiments according to the prevent invention with reference to the drawings.

First Embodiment

Figure 1:
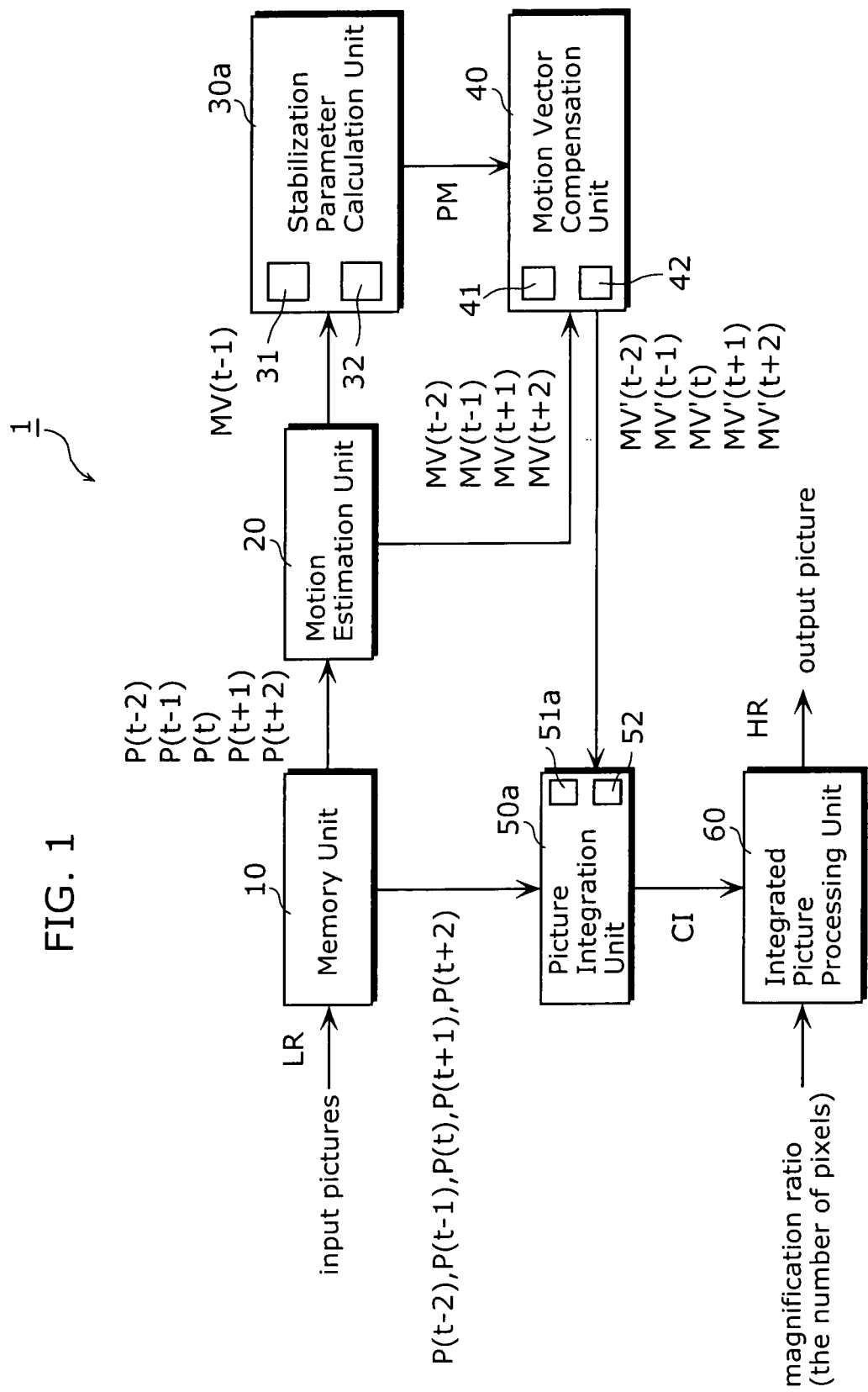
FIG. 1 is a block diagram showing an overall functional structure of an image processing device 1 according to the first embodiment.

FIG. 1 is a block diagram showing an overall functional structure of an image processing device 1 according to the first embodiment.

The image processing device 1 efficiently performs instability modification processing (stabilization) and high resolution processing for low-resolution (LR) pictures which are inputted from a digital video camera or the like. Thereby, the image processing device 1 is capable of generating and outputting a picture which is stabilized and has resolution higher than the resolution of the input LR pictures. The higher resolution is hereinafter referred to as high resolution (HR) or super resolution (SR). As shown in FIG. 1, the image processing device 1 includes a memory unit 10, a motion estimation unit 20, a stabilization parameter calculation unit 30a, a motion vector compensation unit 40, a picture integration unit 50a, and an integrated picture processing unit 60.

The memory unit 10 temporarily holds a plurality of LR pictures which are sequentially inputted every predetermined period.

Figure 2:
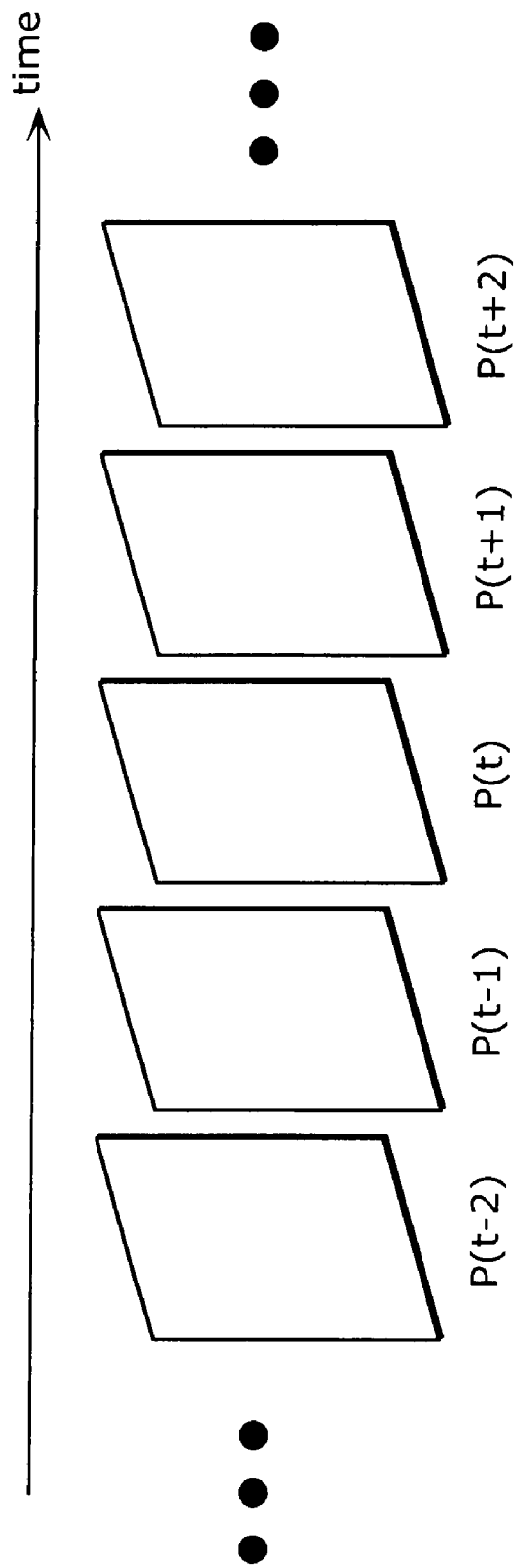
FIG. 2 is a diagram showing an example of a sequence of pictures which are held in a memory unit 10 of FIG. 1.

It is assumed that the inputted LR pictures are a sequence of pictures as shown in FIG. 2, in which an picture to be processed (referred to also as a target picture) is a picture P(t). It is also assumed that, in the input pictures, pictures temporally positioned prior and subsequent to the target picture P(t) are used as reference pictures in motion estimation of the motion estimation unit 20. Here, the reference pictures are four LR pictures P(t−2), P(t−1), P(t+1), and P(t+2).

From the memory unit 10, the motion estimation unit 20 reads the five LR pictures P(t−2), P(t−1), P(t), P(t+1), and P(t+2). Here, the target picture P(t) is temporally positioned at the center of these LR pictures, while a plurality of (four, for example) reference pictures, which are other LP pictures, are temporally positioned prior or subsequent to the target picture P(t). Then, the motion estimation unit 20 estimates respective motion amounts (deviation amounts, or motion vectors) between the target picture P(t) and the respective reference pictures, thereby obtaining motion vectors MV(t−2), MV(t−1), MV(t+1), and MV(t+2).

The stabilization parameter calculation unit 30a calculates a stabilized global motion parameter PM which is used in stabilization to modify instability of the target picture. The stabilization parameter calculation unit 30a includes a global motion parameter calculation unit 31 and a stabilized global motion parameter calculation unit 32. The global motion parameter calculation unit 31 calculates a global motion parameter which represents dominant motion in the whole image region of the target picture. The stabilized global motion parameter calculation unit 32 calculates a stabilized global motion parameter, by modifying instability of the global movement parameter based on a history of the global movement parameter.

Based on the motion vectors MV(t−2), MV(t−1), MV(t+1), and MV(t+2) estimated by the motion detection unit 20, and the stabilized global motion parameter PM obtained by the stabilization parameter calculation unit 30a, the motion vector compensation unit 40 calculates a stabilized motion vector MV'(t) of the target picture P(t). The motion vector compensation unit 40 includes the first compensation unit 41 and the second compensation unit 42. Using the stabilized global motion parameter PM obtained by the stabilization parameter calculation unit 30a, the first compensation unit 4 modifies instability of the estimated motion vectors MV(t−2), MV(t−1), MV(t+1), and MV(t+2), thereby obtaining stabilized motion vectors MV'(t−2), MV'(t−1), MV'(t+1), and MV'(t+2). On the other hand, the second compensation unit 42 calculates a motion vector MV(t) of the target picture P(t).

Using the motion vectors MV'(T), where t−2≦−T≦−t+2, the picture integration unit 50a shifts the target picture and the reference pictures with sub-pixel precision, and then integrates those pictures. The picture integration unit 50a includes the first integration unit 52 and the second integration unit 51a.

The first integration unit 52 shifts pixels in the target picture with the motion vector MV'(t) to paste the pixels onto the integrated space.

The second integration unit 51a shifts a pixel of each reference picture with the stabilized motion vector MV'(T), where T=t−2, t−1, t+1, t+2, in order to past the pixel in the integrated space.

The integrated picture processing unit 60 generates a HR picture from the integrated picture CI which is obtained by combining (integrating) the pictures with sub-pixel precision.

The following describes processing performed by the units in the image processing device 1.

Figure 3:
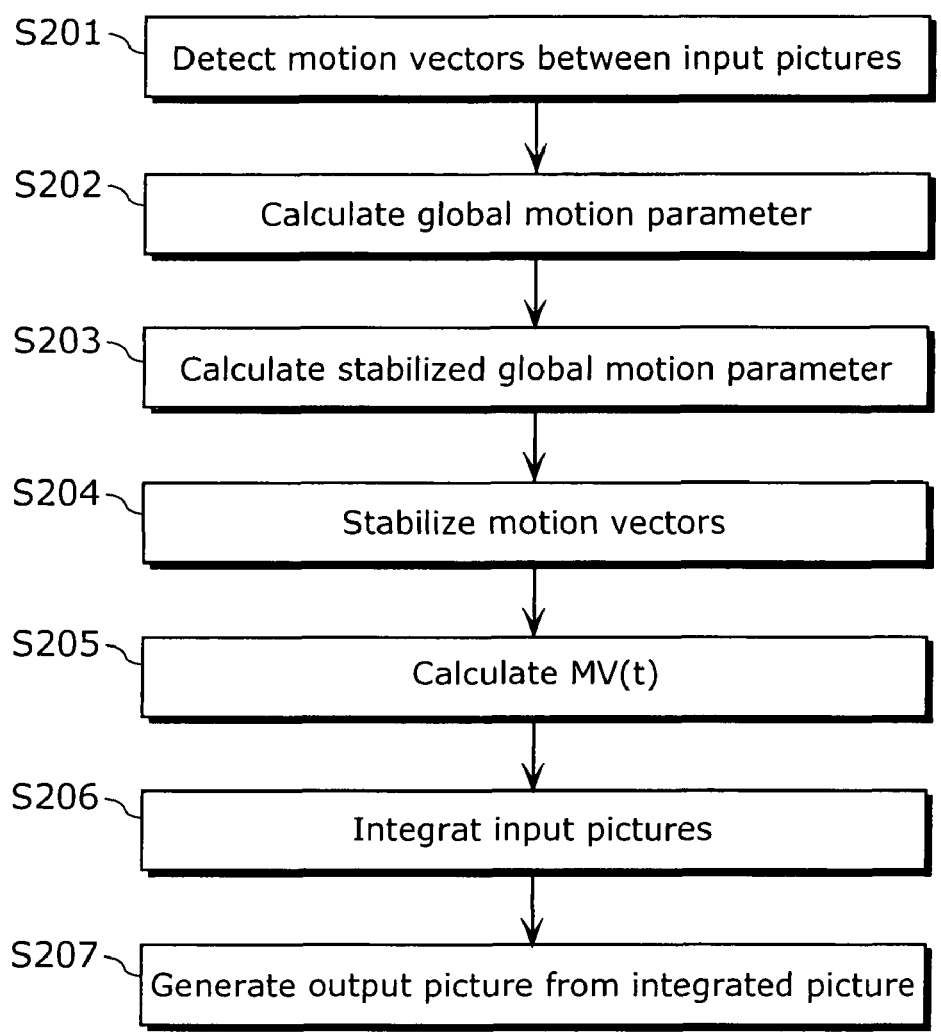
FIG. 3 is a flowchart showing processing performed by units in the image processing device 1.

FIG. 3 is a flowchart showing processing performed by the units in the image processing device 1.

Figure 4:
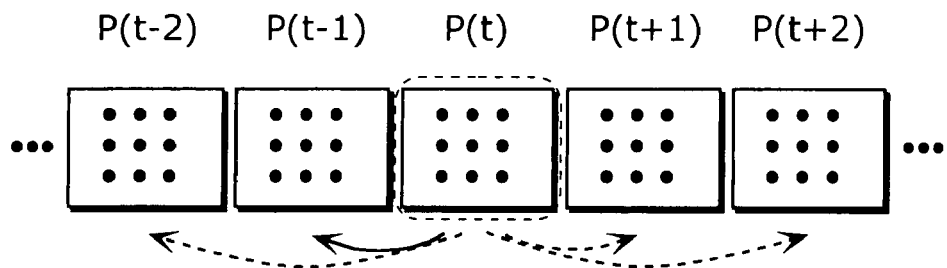
FIG. 4 is a diagram for explaining detection of motion amounts between pictures.

The motion estimation unit 20 reads the LR pictures P(t−2), P(t−1), P(t), P(t+1), P(t+2) from the memory unit 10. Then, as shown in FIG. 4, the motion estimation unit 20 estimates respective motion vectors between the target picture P(t) and the respective reference pictures, thereby obtaining motion vectors MV(t−2), MV(t−1), MV(t+1), and MV(t+2) (S201).

Prior to the above motion estimation, the target picture P(t) is divided into a plurality of segments, for each of which the motion estimation is to be performed. Examples of the dividing are: a method of dividing the target picture into regular squares or rectangles; a method of dividing the target picture into regular squares or rectangles, and further dividing each square or rectangle into further segments; a method of setting a point in the target picture and dividing the target picture using the point as a center of the dividing; and the like. Any dividing methods are applicable.

In the motion estimation, a segment similar to a target segment in the target picture P(t) is extracted from each of the reference pictures. Here, an index for representing the similarity of the segments may be a sum of absolute differential values of corresponding pixels in the target picture and the reference picture, a sum of difference square values of the corresponding pixels, or the like. Here, the smaller the sum is, the higher the similarity is, so that a segment whose sum with the corresponding segment becomes minimum is to be selected from each reference picture. The selected segment is referred to as a "reference segment". In this case, a motion vector between the target segment and the reference segment is a two-dimensional vector which represents difference between (i) a position of the target segment in the target picture and (ii) a position of the reference segment in the reference picture. The positions are represented by two-dimensional coordinates, for example, in which an original point is set at upper left of the picture, X-coordinates are rightwards from the original point, and Y-coordinates are downwards from the original point.

Note that the motion estimation unit 20 calculates the motion vectors with sub-pixel precision. Examples of the calculation are: a method of obtaining pixel values at sub-pixel positions in the reference picture using linear interpolation or the like, and then calculating the above-mentioned similarity; a method of estimating motion vectors with sub-pixel precision based on the similarity calculated with integer-numbered pixel precision; and the like. Any methods are applicable.

Among the estimated motion vectors, the motion estimation unit 20 outputs the motion vector MV(t−1), which is estimated using the picture P(t−1), to the stabilization parameter calculation unit 30a. Furthermore, the motion estimation unit 20 outputs all of the estimated motion vectors to the motion vector compensation unit 40. Those estimated motion vectors are the vector MV(t−2) estimated using the picture P(t−2), the vector MV(t−1) estimated using the picture P(t−1), the vector MV(t+1) estimated using the picture P(t+1), and the vector MV(t+2) estimated using the picture P(t+2).

The global motion parameter calculation unit 31 in the stabilization parameter calculation unit 30a firstly calculates a global motion parameter, using the motion vector MV(t−1) inputted from the motion estimation unit 20 (Step S202). In the case where, for example, affine models are used as motion vectors, global motion of the global motion parameter is determined by the following equation (1).

[Equation 1]

$$\begin{pmatrix} x' \\ y' \end{pmatrix} = \begin{pmatrix} a_0 \\ b_0 \end{pmatrix} + \begin{pmatrix} a_1 & a_2 \\ b_1 & b_2 \end{pmatrix} \begin{pmatrix} x \\ y \end{pmatrix} \qquad (1)$$

Figure 5:
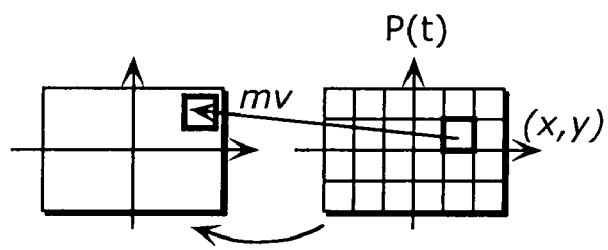
FIG. 5 is a diagram for explaining a global motion parameter.

The equation (1) represents that, as shown in FIG. 5, a pixel positioned at coordinates (x, y) moves to coordinates (x', y'), according to the global motion parameter (a0, a1, a2, b0, b1, b2). Here, assuming that the global motion is only horizontal shift, a1=b2=1, and a2=b1=0.

As one example, in the calculation of the global motion parameter, the global motion parameter calculation unit 31 assigns coordinates (x', y') of each of the target segments of the target picture into the equation (1), thereby obtaining coordinates of a reference segment. Then, the global motion parameter calculation unit 31 calculates a sum of difference square values of (i) the coordinates of the reference segment which are obtained using the above equation and (ii) coordinates of the reference segment which are obtained using the motion vector of the target segment. Eventually, the global motion parameter calculation unit 31 obtains a global motion parameter by which the sum becomes minimum in the entire target picture. Note that the coordinates of the reference segment obtained using the motion vector of the target segment is (x+mvx, y+mvy), assuming that the motion vector of the target segment is (mvx, mvy).

Subsequently, the stabilized global motion parameter calculation unit 32 in the stabilization parameter calculation unit 30a modifies instability of the global motion parameter, based on a history of global motion parameter, thereby obtaining a stabilized global motion parameter (Step S203). The stabilization of the global motion parameter is performed to remove subtle variations of the global motion parameter in a time direction, in other words, to remove in-stabilized components.

Figure 6:
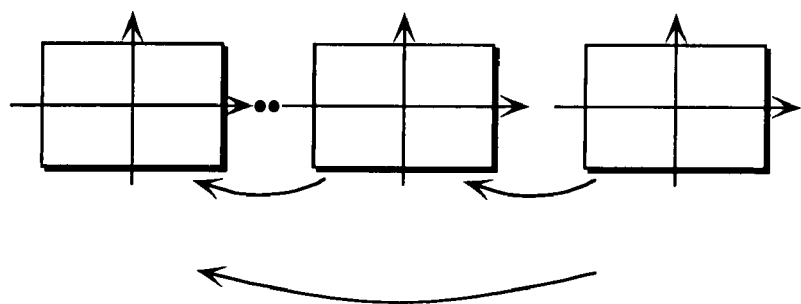
FIG. 6 is a diagram for explaining modification of the global motion parameter.

As one example, as shown in FIG. 6, the stabilized global motion parameter is able to be obtained using (i) respective global motion parameters among the pictures, and (ii) a global motion parameter of the target picture. More specifically, the global motion parameter is applied with high-frequency passing pass filter in a time direction, for example. The resulting stabilized global motion parameter PM=(a0, a1', a2', b0', b1', b2') is outputted to the motion vector compensation unit 40.

The first compensation unit 41 of the motion vector compensation unit 40 modifies the motion vectors MV(t−2), MV(t−1), MV(t+1), MV(t+2), which are obtained from the motion estimation unit 20, using the stabilized global motion parameter PM obtained from the stabilization parameter calculation unit 30a (Step S204).

Furthermore, the second compensation unit 42 calculates a motion vector MV(t) of the target picture P(t) (Step S205).

Figure 7:
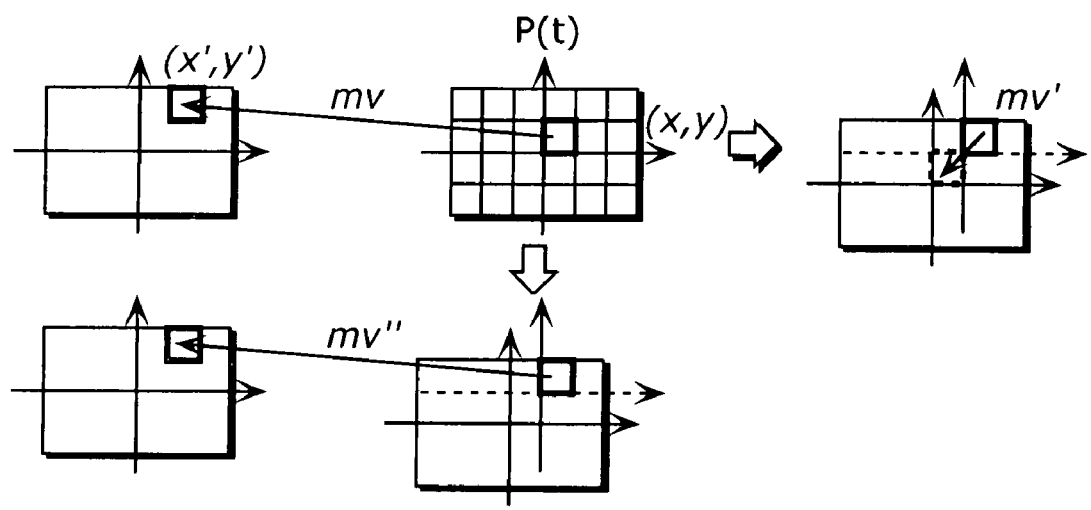
FIG. 7 is a diagram for explaining a motion vector MV' (t, x, y)

The motion vector MV'(t, x, y) corresponding to a pixel positioned at coordinate (x, y) of the target picture P(t) is calculated by applying the stabilized global motion parameter PM to each pixel in the target picture P(t), using the method shown in FIG. 7 for example.

Each component (mvx', mvy') of the motion vector MV'(t, x, y) is determined by the following equation (2).

[Equation 2]

$$\begin{pmatrix} mv'_x \\ mv'_y \end{pmatrix} = \begin{pmatrix} a'_0 & a'_1 - 1 & a'_2 \\ b'_0 & b'_1 & b'_2 - 1 \end{pmatrix} \begin{pmatrix} 1 \\ x \\ y \end{pmatrix} \qquad (2)$$

The modification of the motion vectors obtained from the motion estimation unit 20 is performed by adding the motion vectors, which are obtained by applying the stabilized global motion parameter PM, to the motion vectors, which are obtained by the motion estimation unit 20.

Using the motion vector MV(T, x, y) which has not yet modified and whose component is (mvx, mvy), each component (mvx', mvy') of a motion vector MV'(T, x, y) of a pixel positioned at (x, y) in the reference picture P(T) is determined by the following equation (3). Note that T=t−2, t−1, t+1 or t+2.

[Equation 3]

$$\begin{pmatrix} mv'_x \\ mv'_y \end{pmatrix} = \begin{pmatrix} mv_x \\ mv_y \end{pmatrix} + \begin{pmatrix} a'_0 & a'_1 - 1 & a'_2 \\ b'_0 & b'_1 & b'_2 - 1 \end{pmatrix} \begin{pmatrix} 1 \\ x \\ y \end{pmatrix} \qquad (3)$$

Figure 8:
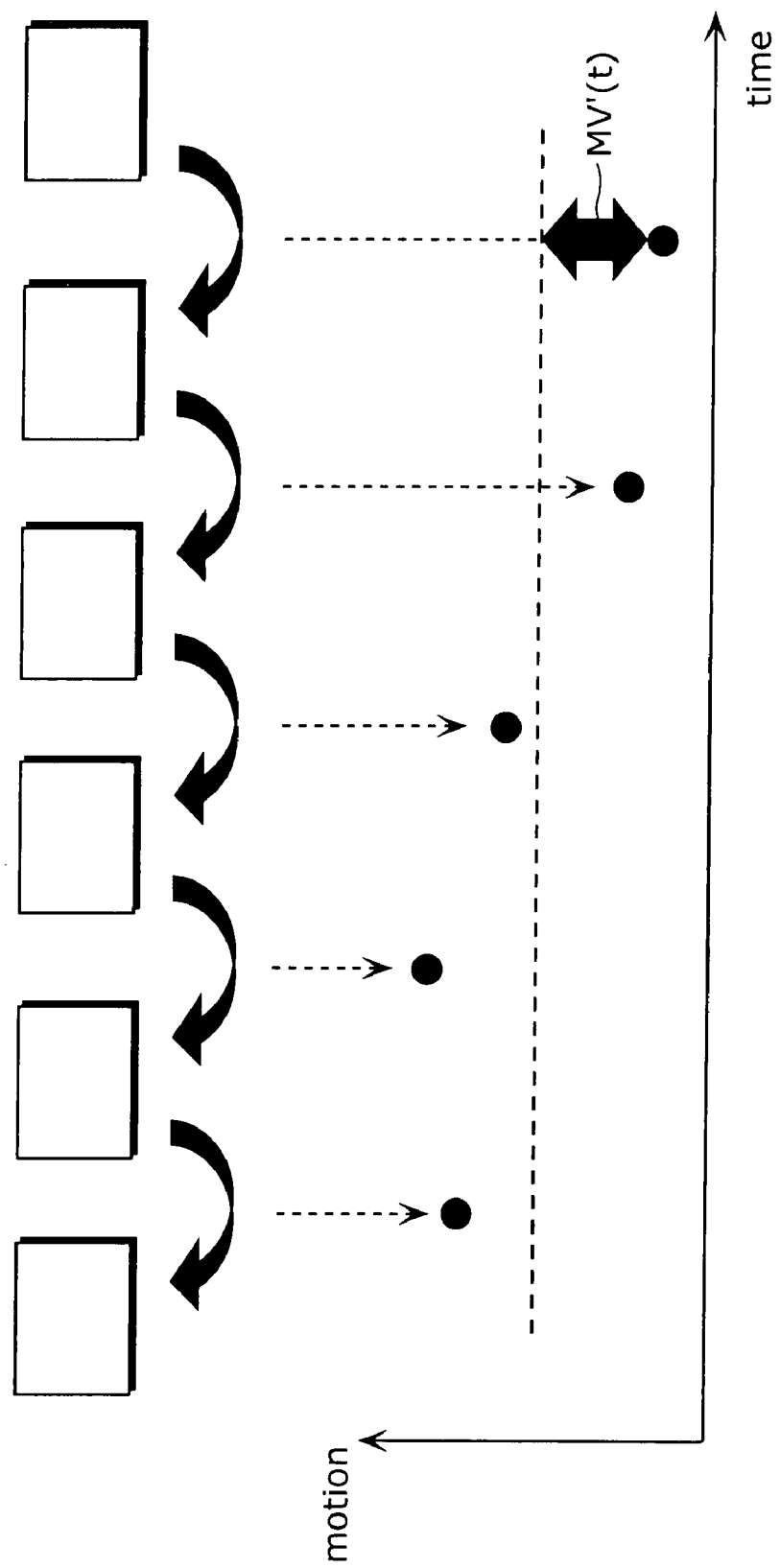
FIG. 8 is a diagram for explaining a motion vector MV' (t) in more detail.

This motion vector MV'(t), as shown in FIG. 8, represents difference between (i) an average value of motion of the prior reference pictures and (ii) a value of motion of an immediately-prior picture, in other words, an amount of modification for the stabilization.

The motion vectors MV'(t−2), MV'(t−1), MV'(t+1), and MV'(t+2), which are stabilized by the first compensation unit 41, and the motion vector MV'(t), which is stabilized by the second compensation unit 42, are outputted to the picture integration unit 50a.

The picture integration unit 50a combines the target picture and a group of the reference pictures with sub-pixel precision, using the motion vectors MV'(T), where t−2−≦T≦t+2 (Step S206).

This integration method is described with reference to FIG. 9.

Figure 9:
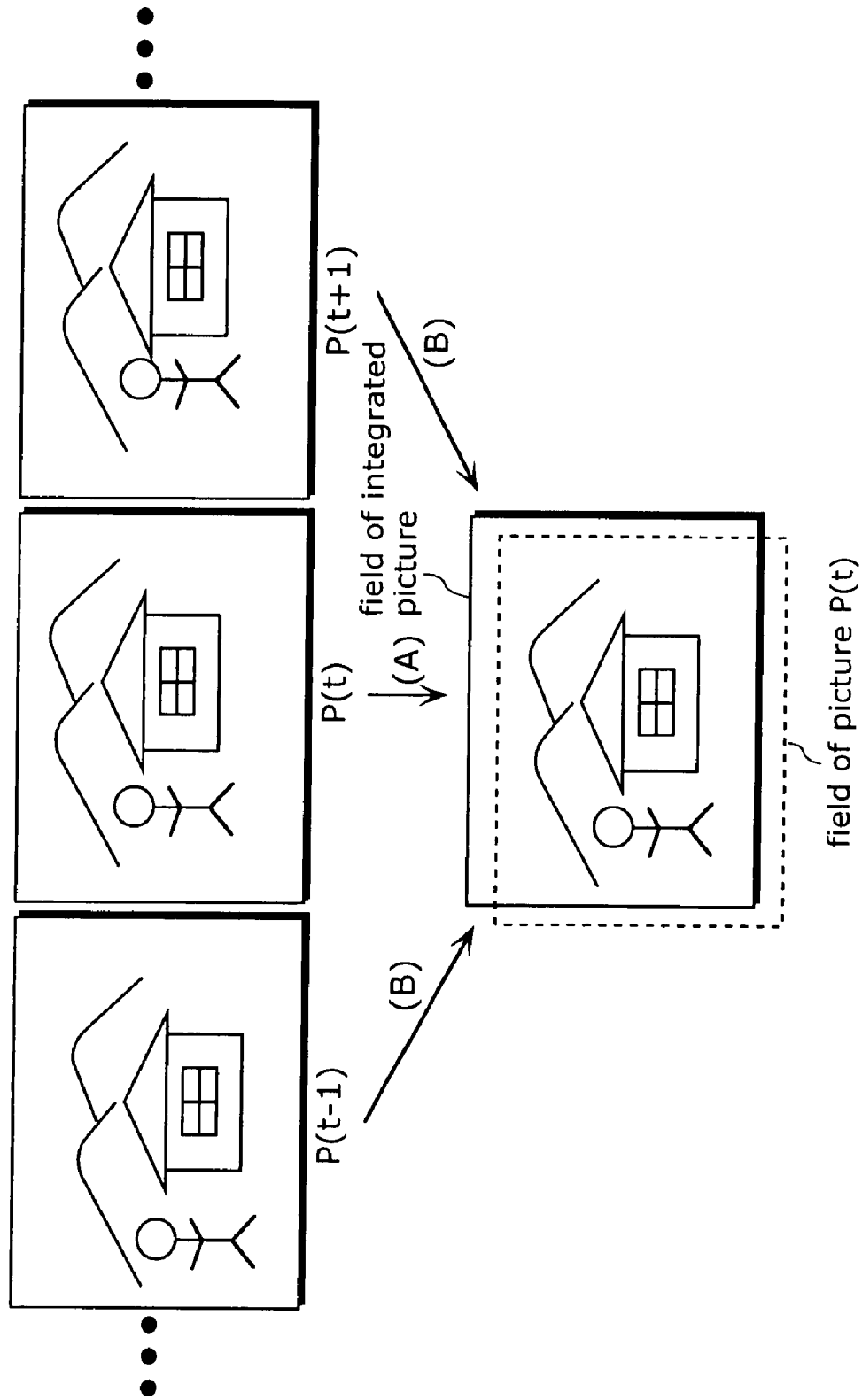
FIG. 9 is a schematic diagram for explaining an image processing method performed by the image processing device 1.

In more detail, the first integration unit 52 in the picture integration unit 50a pastes pixels of the target picture P(t) onto a space for an integrated picture, using the motion vector MV'(t, x, y) (arrow A in FIG. 9).

Next, the second integration unit 51a in the picture integration unit 50a shifts pixels in each of the reference pictures using the respective stabilized motion vectors MV'(T), where T=t−2, t−1, t+1, t+2, so that the shifted pixels are pasted onto the integrated picture space.

Here, since precision of the motion vectors is sub-pixel precision, pixels in the integrated picture are distributed irregularly.

The integrated picture CI is outputted to the integrated picture processing unit 60.

The integrated picture processing unit 60 generates a HR picture from the integrated picture CI in which the input pictures are combined (integrated) with sub-pixel precision (Step S207). Here, it is assumed that magnification ratios applied to the LR pictures are designated by the outside. It is also assumed that a magnification ratio in a horizontal direction is rh (rh>1), and that a magnification ratio in a vertical direction is rv (rv>1). Note that it is possible to designate not the magnification ratios but the number of pixels included in the generated output picture.

Figure 10:
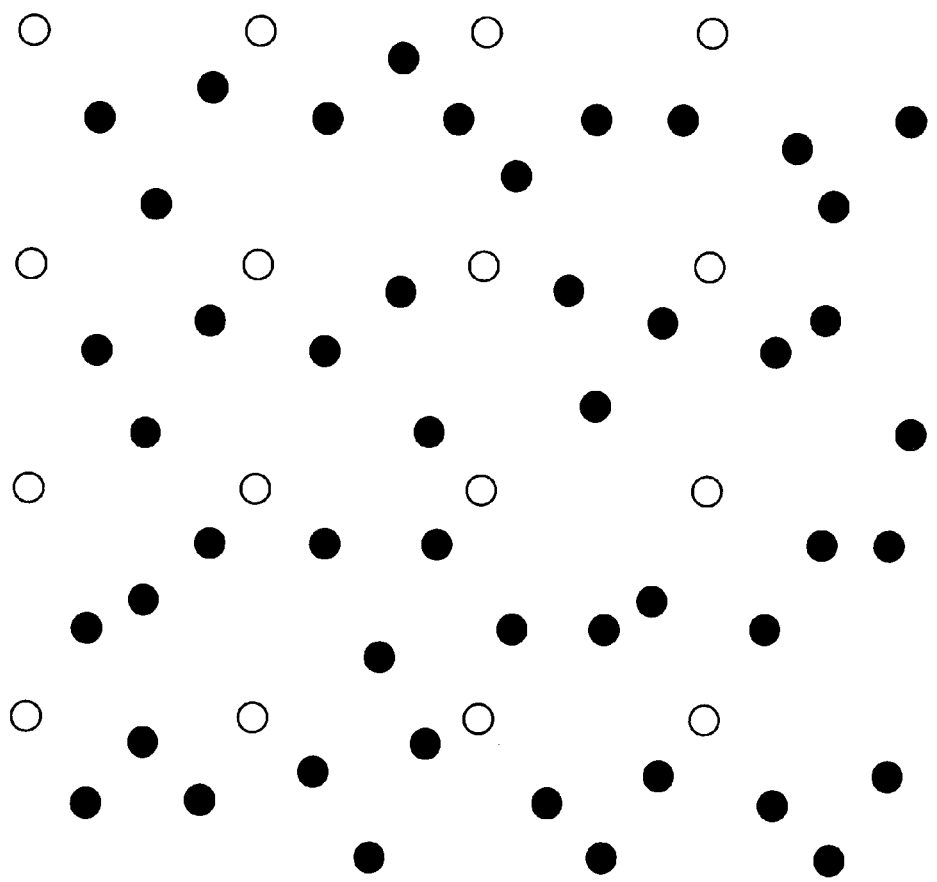
FIG. 10 is a schematic diagram for explaining the image processing method performed by the image processing device 1.

FIG. 10 is a schematic diagram for explaining relationships between positions of pixels in the HR picture to be generated and positions of pixels in the integrated picture CI. Note that, in FIG. 10, white dots represent the positions of pixels in the HR picture and black dots represent the positions of pixels in the integrated picture.

In a horizontal direction, the number of pixels in the HR picture is rh times more than the number of pixels in the LR picture, while in a vertical direction the number is rv times more than the number in the LR picture. These pixels in the HR picture are arranged equally spaced apart. On the other hand, the pixels in the integrated picture are generally located unequally spaced apart. Therefore, it is necessary to generate equally-spaced pixels of the HR picture from the unequally-spaced pixels of the integrated picture.

A conventional method is able to be used to achieve such generating. Examples of such a conventional method are: a method using unequal space sampling; a method of estimating frequency components using deviation amounts of the integrated picture and the frequency components obtained by discrete Fourier transformation or the like, and then performing inverse discrete Fourier transformation; a method of recurrently calculating pixel values so that an object function becomes minimum, such as Landweber method; and the like. Any methods can be applied. Using such a technique, the integrated picture processing unit 60 generates the equally-spaced pixels of the HR picture from the unequally-spaced pixels of the integrated picture, and then outputs the generated HR picture.

As a result, the pixels of the HR picture include high-frequency components whose frequency is higher compared to the LR pictures, so that the generated HR picture has higher resolution.

As described above, the image processing method according to the first embodiment is a method of reconstructing a HR picture from a plurality of LR pictures, and also modifying instability of the input pictures. In more detail, in this image processing method, respective motion vectors (motion amounts, or deviation amounts) between (i) a target picture included in a sequence of LR pictures and (ii) respective reference pictures temporally positioned near the target picture are calculated. Then, using the calculated motion vectors, a stabilized global motion parameter used to modify instability of the input pictures is calculated. When the target picture and the reference pictures are integrated to be an integrated picture, positions of pixels in the target picture are shifted with sub-pixel precision according to the stabilized global motion parameter, thereby mapping these pixels onto the integrated picture space, and positions of pixels in each of the reference pictures are shifted with sub-pixel precision according to stabilized motion vectors modified by the stabilized global motion parameter, thereby mapping these pixels onto the integrated picture space. Finally, from the integrated picture whose pixels are distributed unequally spaced apart, the HR picture is generated, so that pixels of the HR picture are arranged equally spaced apart and the number of these pixels is increased by predetermined magnification ratios.

By using such a method, it is possible to:

(1) perform both of the stabilization processing and the resolution increasing processing, uniformly using the same motion vectors, thereby reducing loads on these processing;

(2) map pixels of the target picture onto the integrated picture space, by shifting positions of the pixels according to the stabilized global motion parameter, thereby realizing the stabilization; and (3) combine LR pictures by shifting the LR pictures with sub-pixel precision with deviation amounts between the pictures, thereby generating a HR picture in which aliasing in the LR pictures are restored.

Thus, the image processing method according to the present invention has the advantages which the conventional technologies do not have.

(First Variation)

Note that the first embodiment has described, in the processing performed by the integrated picture processing unit 60, that the magnification ratio in a horizontal direction is rh (rh>1), and that the magnification ratio in a vertical direction is rv (rv>1). However, the magnification ratios may be rh=rv=1.

In this case, the integrated picture processing unit 60 outputs a HR picture in which the number of pixels is equal to the number of pixels of the input RL pictures. Therefore, in FIG. 10, the number and positions of the pixels shown as the white dots are the same as the number and positions of the pixels of the input LR pictures.

Here, the pixels in the integrated picture CI, which are outputted from the picture integration unit 50a, are distributed unequally spaced apart.

This means that the pixels of the integrated picture have high-frequency components whose frequency is higher than the LR picture, so that a higher-resolution picture, which is the HR picture, is generated from the integrated picture.

Accordingly, the first variation is, like the first embodiment, capable of easily realizing the stabilization and generating an output picture without blurs.

Second Embodiment

Next, an image processing device according to the second embodiment of the present invention is described.

In the first embodiment, the integrated picture generation is performed after the stabilization. The second embodiment, however, differs from the first embodiment mainly in that the stabilization is performed after the integrated picture generation.

Figure 11:
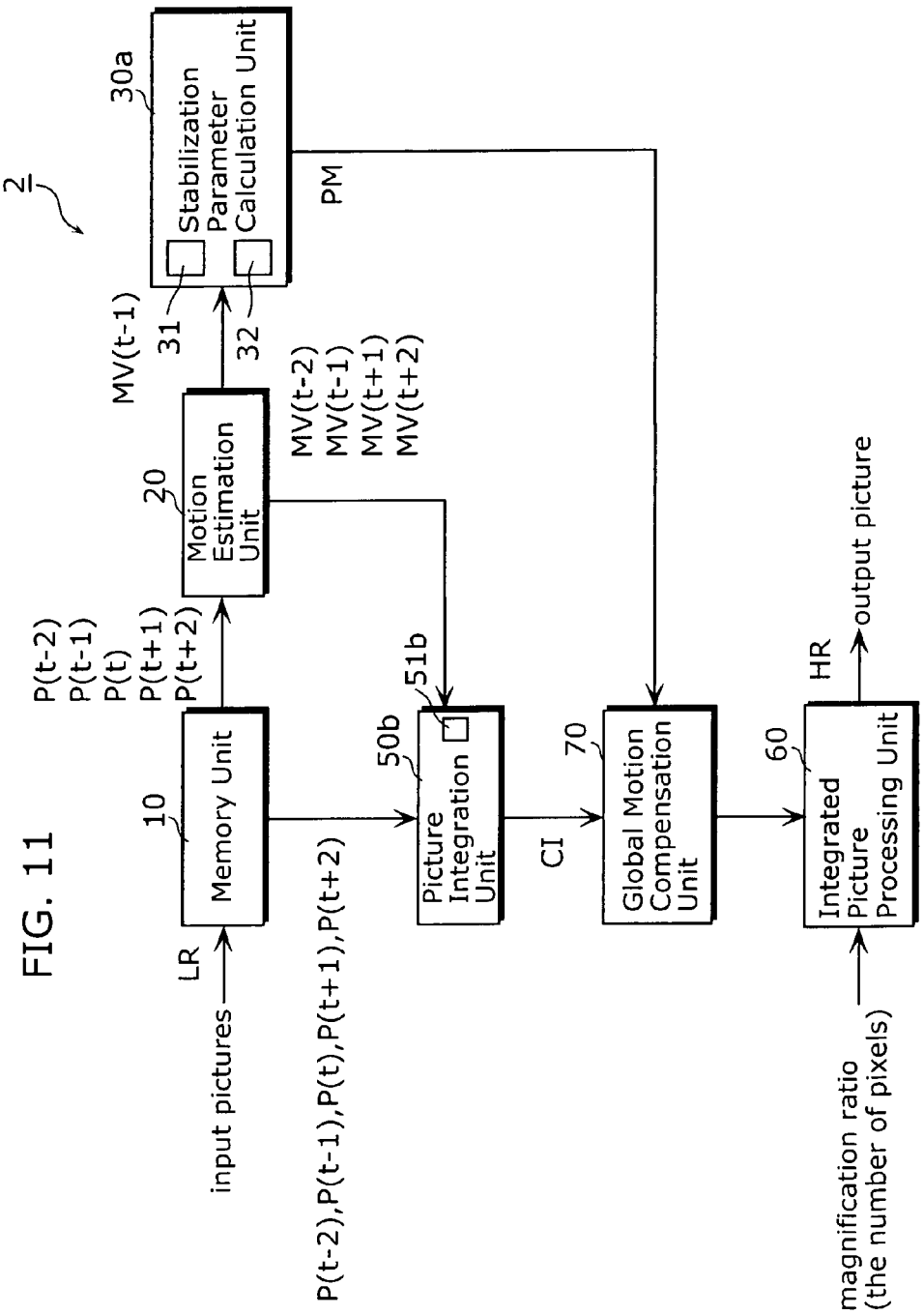
FIG. 11 is a block diagram showing a functional structure of an image processing device 2 according to the second embodiment.

FIG. 11 is a block diagram showing a functional structure of the image processing device 2 according to the second embodiment. Note that the same units are designated by the same reference numerals in the image processing device 1 of the first embodiment, and those units are not described again below.

Like the image processing device 1, the image processing device 2 includes, as shown in FIG. 11, the memory unit 10, the motion estimation unit 20, the stabilization parameter calculation unit 30a, and the integrated picture processing unit 60, and further includes a picture integration unit 50b and a global motion compensation unit 70.

Using the motion vectors MV(t−2), MV(t−1), MV(t+1), and MV(t+2), the picture integration unit 50b integrates the LR pictures P(t−2), P(t−1), P(t), P(t+1), P(t+2) to generate the integrated picture CI.

The global motion compensation unit 70 modifies instability of positions of pixels in the integrated picture, using the stabilized global motion parameter PM.

The following describes processing performed by the units of the image processing device 2.

Figure 12:
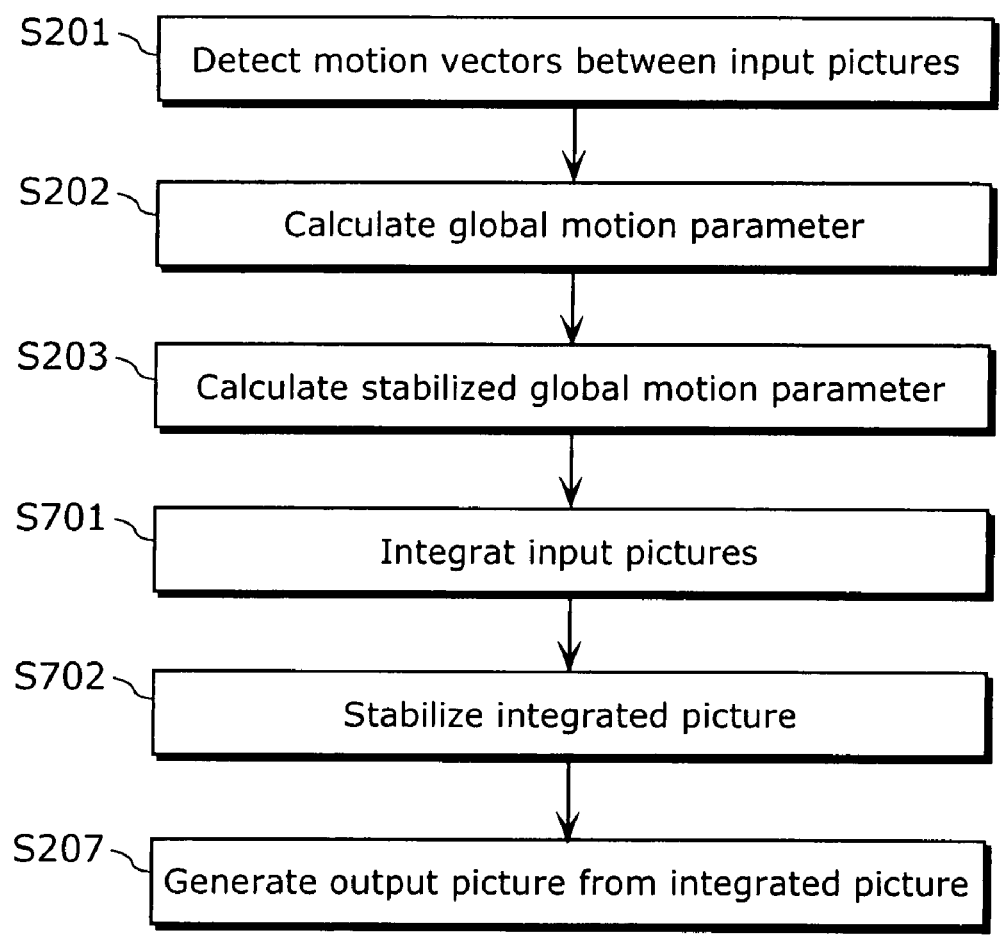
FIG. 12 is a flowchart showing processing performed by units in the image processing device 2.

FIG. 12 is a flowchart showing the processing performed by units in the image processing device 2. Note that the same steps are designated by the same step numerals in the flowchart of the first embodiment, and those steps are not described again below.

The picture integration unit 50b combines the target picture and the reference pictures with sub-pixel precision, using the motion vectors (T), where $t-2 \leq -T \leq t+2$, $T \neq t$ (Step S701). Here, the pixels in the target picture are mapped on the integrated picture space by being shifted with a motion amount 0. The resulting integrated picture CI is outputted to the global motion compensation unit 70.

The global motion compensation unit 70 modifies instability of the positions of the pixels in the integrated picture, using the stabilized global motion parameter PM outputted by the stabilization parameter calculation unit 30a (Step S702).

Assuming that the modified global motion parameter PM is (a0', a1', a2', b0', b1', b2'), a pixel at a position (x, y) in the integrated picture is shifted to a position (x', y'), according to the following equation (4).

[Equation 4]

$$\begin{pmatrix} x' \\ y' \end{pmatrix} = \begin{pmatrix} a'_0 \\ b'_0 \end{pmatrix} + \begin{pmatrix} a'_1 & a'_2 \\ b'_1 & b'_2 \end{pmatrix} \begin{pmatrix} x \\ y \end{pmatrix} \quad (4)$$

The stabilized integrated picture is outputted to the integrated picture processing unit 60.

In the same manner as described in the first embodiment, the integrated picture processing unit 60 generates a HR picture from the integrated picture CI in which the input pictures are combined with sub-pixel precision (Step S207).

As described above, the image processing method according to the second embodiment is a method of reconstructing a HR picture from a plurality of LR pictures, and also modifying instability included in the input pictures. In more detail, in this image processing method, firstly, respective motion vectors (motion amounts, or deviation amounts) between (i) a target picture included in a sequence of LR pictures and (ii) respective reference pictures temporally positioned near the target picture are calculated. Then, using the calculated motion vectors, a stabilized global motion parameter used to modify instability is calculated. Next, using the motion vectors, the target picture and the reference pictures are integrated to generate an integrated picture. Further, positions of pixels in the integrated picture are modified using the stabilized global motion parameter as stabilization.

Finally, from the integrated picture whose pixels are distributed unequally spaced apart, the HR picture is generated, so that pixels in the HR picture are arranged equally spaced apart and the number of these pixels is increased using predetermined magnification ratios.

The above-described method provides the advantages as described in the first embodiment.

(Second Variation)

Note that, in the second embodiment, in the processing performed by the integrated picture processing unit 60, the magnification ratio in a horizontal direction is rh (rh>1), and the magnification ratio in a vertical direction is rv (rv>1). However, the magnification ratios may be rh=rv=1.

In this case, as described in the second embodiment, the target picture and the reference pictures are integrated to be an integrated picture using the motion vectors calculated by the motion estimation unit 20, then positions of the pixels in the integrated picture are modified using the stabilized global motion parameter obtained by the stabilization parameter calculation unit 30a, and eventually an input picture, in which pixels are arranged equally spaced apart and the number of these pixels is equal to the number of pixels in the input pictures, is generated from the integrated picture whose pixels are located unequally spaced apart.

Accordingly, the first variation is also, like the first embodiment, capable of easily realizing the stabilization and generating an output picture without blurs.

Third Embodiment

Next, an image processing device according to the third embodiment of the present invention is described.

Figure 13:
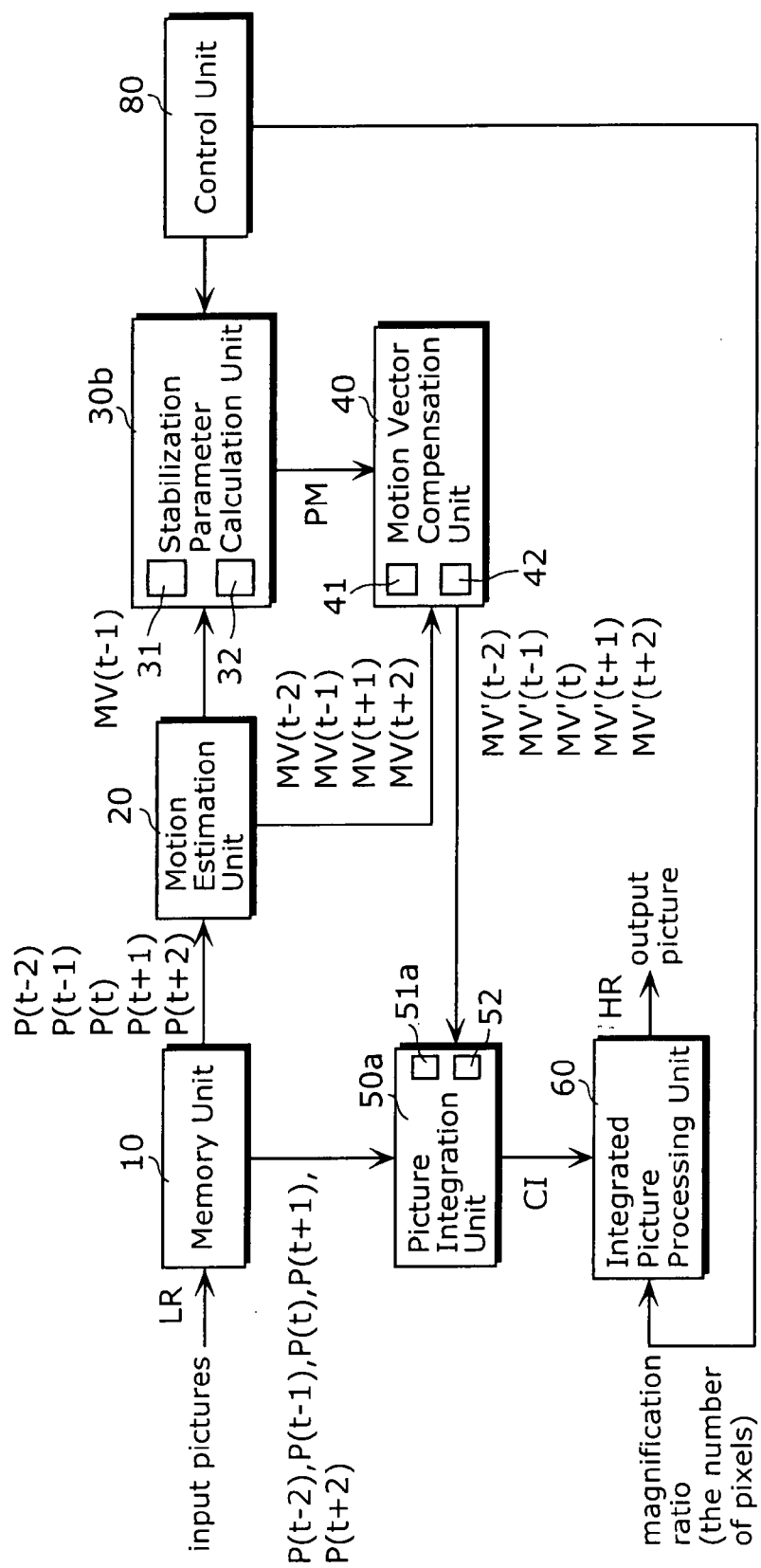
FIG. 13 is a block diagram showing a functional structure of an image processing device 3 according to the third embodiment.

FIG. 13 is a block diagram showing a functional structure of the image processing device 3 according to the third embodiment. Note that the same units are designated by the same reference numerals in the image processing devices of the first and second embodiments, and those units are not described again below.

The first and second embodiments have described that the integrated picture processing unit 60 integrates the pictures based on the magnification ratios rh and rv which are instructed from the outside. However, the third embodiment differs from the first and second embodiments in that maximum values of the stabilization performed by the stabilization parameter calculation unit 30a is limited by instructions from a control unit 80, then the magnification ratios are determined based on the maximum values, and eventually the integrated picture processing unit 60 performs the integration based on the determined magnification ratios.

As shown in FIG. 13, the image processing device 3 includes the memory unit 10, the motion estimation unit 20, the motion vector compensation unit 40, the picture integration unit 50a, and the integrated picture processing unit 60, and further includes a stabilization parameter calculation unit 30b and a control unit 80.

The following describes processing performed by the units which the image processing device 3 has but the image processing devices 1 and 2 do not have.

Firstly, in the same manner as described in the first embodiment, the stabilization parameter calculation unit 30b calculates a global motion parameter using the motion vector MV(t−1) inputted from the motion estimation unit 20. Next, in the same manner as described in the first embodiment, the global motion parameter is stabilized based on the history of the global motion parameter to obtain a stabilized global motion parameter. The stabilized global motion parameter is calculated so that a motion amount does not exceed the designated maximum values. Note that the maximum values of the motion amount are assumed to be designated by the control unit 80.

Next, the maximum values of the motion amount are described with reference to FIGS. 14A and 14B.

Figure 14A:
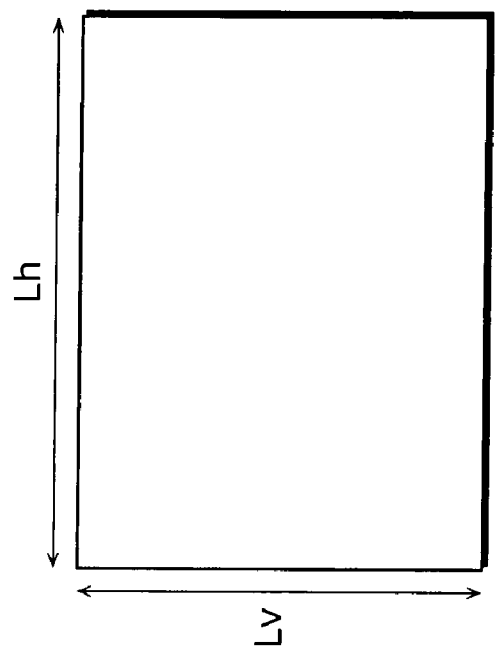
FIGS. 14A and 14B are diagrams for explaining a maximum value of a motion amount.
Figure 14B:
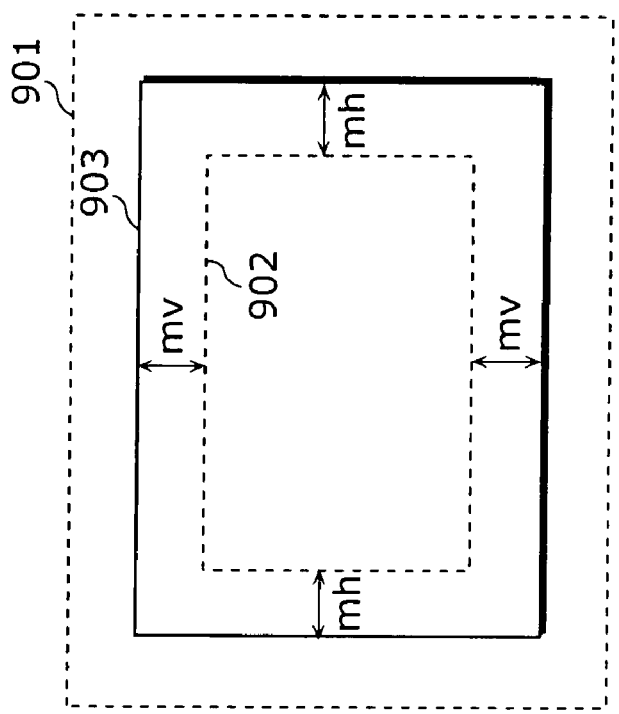

FIG. 14A shows a picture for which the stabilization has not yet been performed using the stabilized global motion parameter. In the third embodiment, pixels in the picture of FIG. 14A are shifted using the stabilized global motion parameter, so that there is no pixel in the outside shown as a region 901 in FIG. 14B.

In this case, the maximum values of the motion amount are mh in a horizontal direction and mv in a vertical direction. In other words, the maximum values are set to ensure that the picture exists inside a region 902. The resulting stabilized global motion parameter PM=(a0', a1', a2', b0', b1', b2') is outputted to the motion vector compensation unit 40.

Processing performed by the motion vector compensation unit 40 and the picture integration unit 50a are the same as described in the first embodiment, so that the processing are not described again below.

The integrated picture processing unit 60 generates a HR picture from the integrated picture in which the input pictures are combined by the picture integration unit 50a with sub-pixel precision. This generating is performed as described in the first embodiment, but the used magnification ratios rh and rv are designated by the control unit 80.

The control unit 80 calculates the magnification ratios rh and rv, based on the maximum values of the motion amount designated for the stabilization parameter calculation unit 30b. For example, in order to output a picture whose pixels have the same number and the same arrangement as the input pictures, the region 902 is to be enlarged to have a size of the input pictures (size of the region 903). In this case, magnification ratios rh' and rv' are calculated using the following equation (5).

[Equation 5]

$$\begin{cases} r'_h = L_h / (L_h - 2 \times m_h) \\ r'_v = L_v / (L_v - 2 \times m_v) \end{cases} \quad (5)$$

On the other hand, in order to output a picture whose size is horizontally rh times larger and vertically rv times larger than the input pictures, the magnification ratios rh' and rv' obtained by the equation (5) are further multiplied by rh and rv, respectively. Based on the magnification ratios, the integrated picture processing unit 60 generates a picture having equally-spaced pixels from the integrated picture having unequally-spaced pixels, and then outputs the generated picture.

As described above, the image processing method according to the present embodiment is a method of reconstructing a HR picture from a plurality of LR pictures, and also modifying instability of the input pictures. In more detail, in this image processing method, respective motion vectors (motion amounts, or deviation amounts) between (i) a target picture included in a sequence of LR pictures and (ii) respective reference pictures temporally positioned near the target picture are calculated. Then, using the calculated motion vectors, a stabilized global motion parameter used to modify the instability is calculated. Here, the stabilized global motion parameter is calculated to satisfy maximum limitation of the motion amounts. When the target picture and the reference pictures are integrated to be an integrated picture, positions of pixels in the target picture are shifted with sub-pixel precision according to the stabilized global motion parameter, thereby mapping these pixels onto the integrated picture space, and positions of pixels in each of the reference pictures are shifted with sub-pixel precision according to stabilized motion vectors modified by the stabilized global motion parameter, thereby mapping these pixels onto the integrated picture space. Finally, from the integrated picture whose pixels are distributed unequally spaced apart, the HR picture is generated, so that pixels of the HR picture are arranged equally spaced apart and the number of these pixels is increased by desired magnification ratios. Here, the magnification ratios are determined using the maximum limitation used in the calculation of the stabilized global motion parameter.

The above-described method provides the advantages as described in the first embodiment. In the conventional stabilization, an output picture has regions without pixels on its edges, so that the edges are removed prior to the outputting. In the above-described second variation, however, it is possible to generate a desired-sized output picture without blurs.

(Third Variation)

The third embodiment has described that, in the generation of the integrated picture, positions of pixels in the target picture are shifted with sub-pixel precision according to the stabilized global motion parameter, thereby mapping these pixels onto the integrated picture space, and positions of pixels in each of the reference pictures are shifted with sub-pixel precision according to stabilized motion vectors modified by the stabilized global motion parameter, thereby mapping these pixels onto the integrated picture space. However, it is also possible that the stabilization parameter calculation unit of the second embodiment calculates in-stabilized variant component by which pixel motion amounts do not exceed predetermined maximum values, and that the integrated picture processing unit 60 determines the magnification ratios based on the number of pixels in the input pictures and the maximum values. In other words, as described in the second embodiment, it is possible that the target picture and the reference pictures are integrated to be an integrated picture using the motion vectors calculated by the motion estimation unit 20, that positions of the pixels in the integrated picture are modified using the stabilized global motion parameter obtained by the stabilization parameter calculation unit 30a, and that eventually an input picture, in which pixels are arranged equally spaced apart and the number of these pixels is equal to the number of pixels in the input pictures, is generated from the integrated picture whose pixels are located unequally spaced apart.

Although the embodiments and variations have described that the motion estimation is performed for the target picture, it is also possible to perform motion estimation for each of the reference pictures. In such a case, processing almost same as the processing in the embodiments is able to be performed. Note that "motion estimation for each of the reference pictures" means dividing each reference picture into segments, and extracting, from the target picture, each segment which is the most similar to each segment of the reference picture.

Further, the embodiments and the variations have described that the global motion parameter is calculated using the motion vector between the target picture P(t) and the reference picture P(t−1). However, the global motion parameter may be calculated using another motion vector between the target picture and another reference picture.

Furthermore, although the embodiments and the variations have described that the number of used reference pictures are four, the number is not limited to the above but any number is possible.

Still further, the embodiments and the variations have described that the target picture and the reference pictures are integrated based on the motion vectors. However, if a motion vector in a certain segment is not reliable, a pixel in the segment is not necessarily integrated.

Still further, the units included in each of the above-described image processing devices 1 to 3 may be integrated as a single integrated circuit, or each of the above-described image processing devices 1 to 3 may be embedded in a camera.

Fourth Embodiment

Furthermore, the image processing method described in the above embodiments and variations can be realized by a program which is recorded on a recording medium such as a flexible disk. Thereby, it is possible to easily perform the processing as described in the embodiments and the variations in an independent computer system.

Figure 15A:
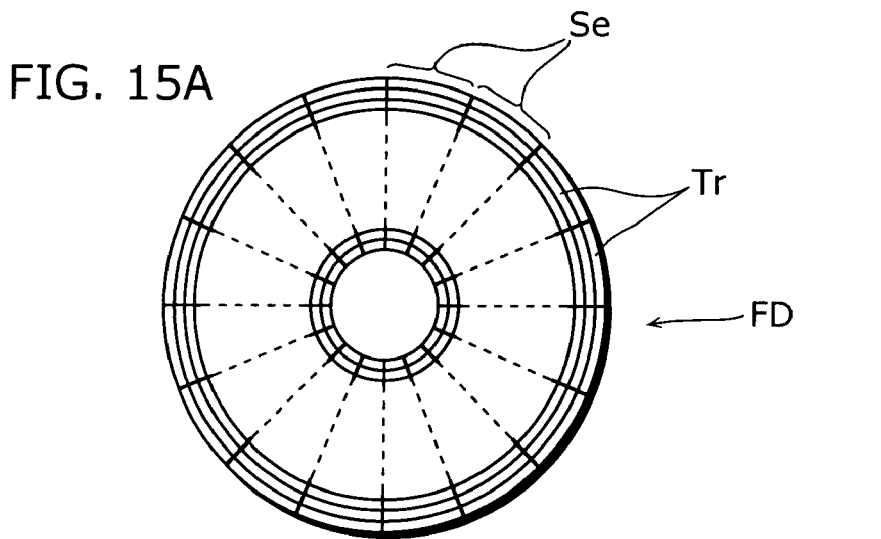
FIGS. 15A, 15B and 15C show explanatory diagrams of a recording medium which stores a computer program product which, when loaded into a computer, allows the computer to execute the image processing methods described in the respective embodiments.
Figure 15B:
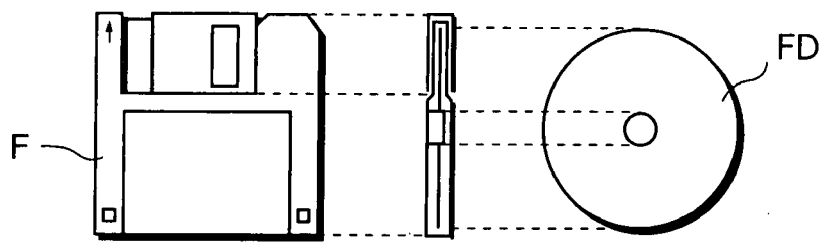
Figure 15C:
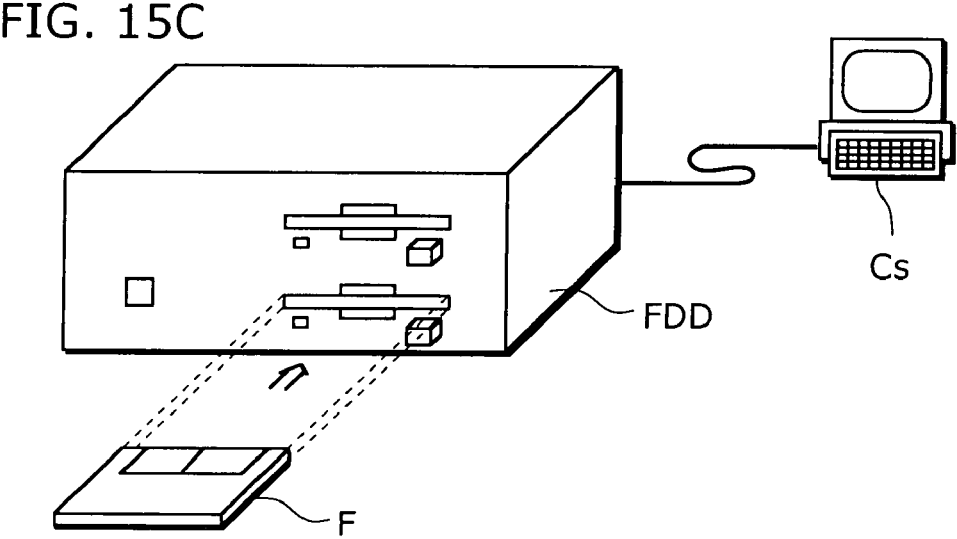

FIGS. 15A, 15B, and 15C are explanatory diagrams, where the image processing method described in the above embodiments and variations are realized in a computer system using a program recorded in a recording medium, such as flexible disk.

FIG. 15B shows a front view and a cross-sectional view of a case of the flexible disk, and a view of the flexible disk itself, and FIG. 15A shows an example of a physical format of the flexible disk, as a recording medium body. The flexible disk FD is contained in the case F, and on a surface of the disk, a plurality of tracks Tr are formed concentrically from the outer periphery to the inner periphery, and each track is segmented into sixteen sectors Se in an angular direction. Therefore, in the flexible disk storing the above-described program, the program is recorded in an area allocated on the above flexible disk FD Moreover, FIG. 15C shows a structure for recording and reproducing the above program on the flexible disk FD. When the program realizing the image processing method is recorded onto the flexible disk FD, the program is written from a computer system Cs via a flexible disk drive. When the above image processing method is constructed in the computer system using the program in the flexible disk, the program is read out from the flexible disk via the flexible disk drive and transferred to the computer system.

Note that the above has described that the recording medium is assumed to be the flexible disk, but the recording medium may be an optical disk. Note also that, the recording medium is not limited to the above mediums, but any other mediums, such as an IC card and a ROM cassette, can be also used, as far as the mediums can record the program.

Fifth Embodiment

Furthermore, the applications of the image processing method described in the above embodiments and variations, and a system using such applications are described here.

Figure 16:
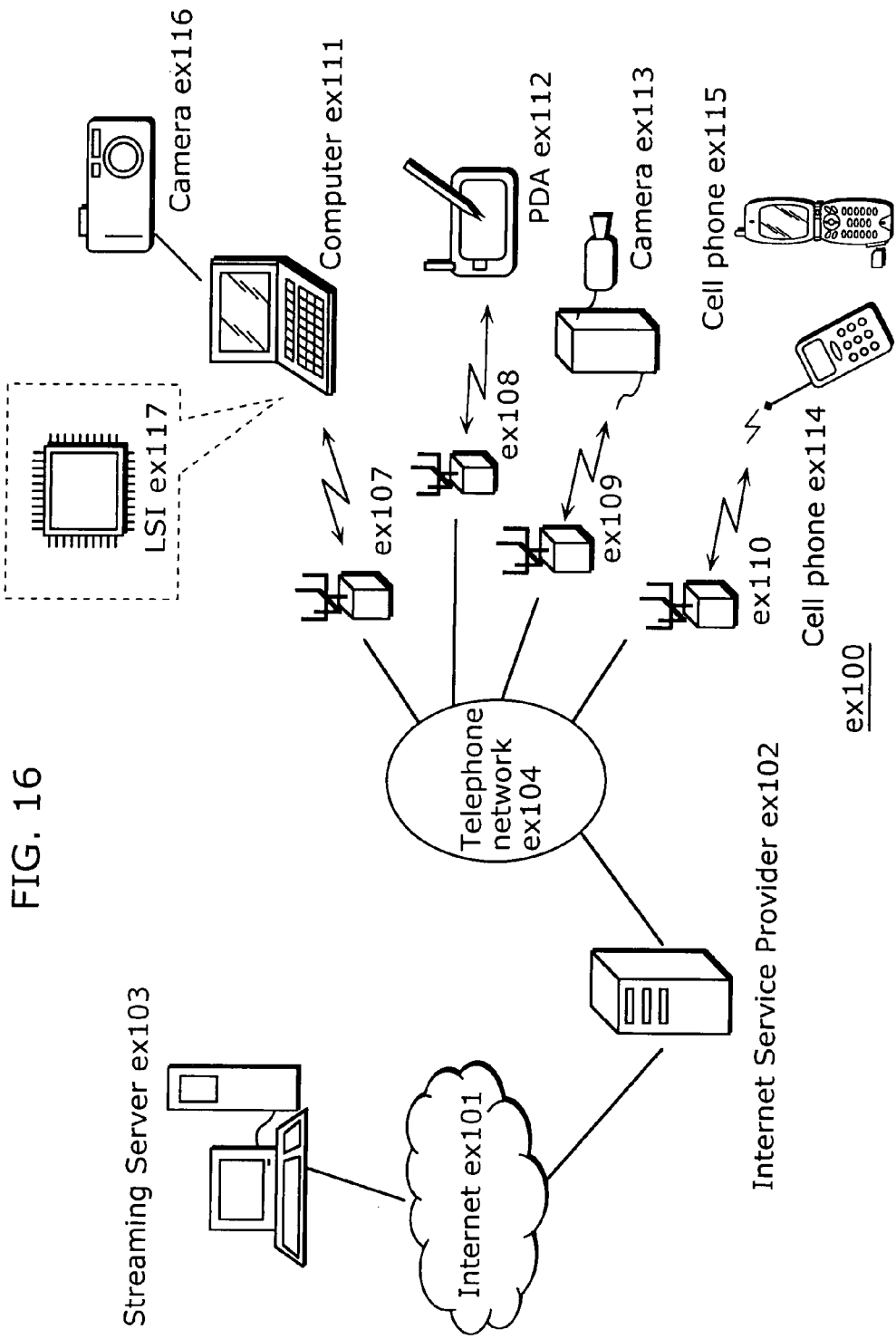
FIG. 16 is a block diagram showing an overall structure of a content supplying system.

FIG. 16 is a block diagram showing the overall configuration of a content supply system ex100 for realizing content distribution service.

The area for providing communication service is divided into cells of desired size, and base stations ex107 to ex110 which are fixed wireless stations are placed in respective cells.

In this content supply system ex100, various devices such as a computer ex111, a personal digital assistant (PDA) ex112, a camera ex113, a cell phone ex114 and a camera-equipped cell phone ex115 are connected to the Internet ex101, via an Internet service provider ex102, a telephone network ex104 and base stations ex107 to ex110, for example.

However, the content supply system ex100 is not limited to the combination as shown in FIG. 16, and may include a combination of any of these devices which are connected to each other. Also, each device may be connected directly to the telephone network ex104, not through the base stations ex107 to ex110 which are the fixed wireless stations.

The camera ex113 is a device such as a digital video camera capable of shooting moving pictures. The cell phone may be any of a cell phone of a Personal Digital Communications (PDC) system, a Code Division Multiple Access (CDMA) system, a Wideband-Code Division Multiple Access (W-CDMA) system and a Global System for Mobile Communications (GSM) system, a Personal Handy-phone System (PHS), and the like.

Also, a streaming server ex103 is connected to the camera ex113 via the base station ex109 and the telephone network ex104, which realizes live distribution or the like using the camera ex113 based on the coded data transmitted from the user. The coding of the data shot by the camera may be performed by the camera ex113, the server for transmitting the data, or the like. Also, the moving picture data shot by a camera ex116 may be transmitted to the streaming server ex103 via the computer ex ill. The camera ex116 is a device such as a digital camera capable of shooting still and moving pictures. In this case, either the computer ex111 or the camera ex116 may code the moving picture data. An LSI ex117 included in the computer ex111 or the camera ex116 performs the coding processing. Note that software for coding and decoding pictures may be integrated into any type of a recording medium (such as a CD-ROM, a flexible disk and a hard disk) that is readable by the computer ex111 or the like. Furthermore, the camera-equipped cell phone ex115 may transmit the moving picture data. This moving picture data is the data coded by the LSI included in the cell phone ex115.

In this content supply system ex100, contents (such as a video of a live music performance) shot by users using the camera ex113, the camera ex116 or the like are coded in the same manner as in the above embodiments and variations and transmitted to the streaming server ex103, while the streaming server ex103 makes stream distribution of the above content data to the clients at their requests. The clients include the computer ex111, the PDA ex112, the camera ex113, the cell phone ex114, and the like, capable of decoding the above-mentioned coded data. The content supply system ex100 is a system in which the clients can thus receive and reproduce the coded data, and further can receive, decode and reproduce the data in real time so as to realize personal broadcasting.

When each device included in this system performs processing, the image processing method in the above embodiments and variations may be used.

A cell phone is now described as an example thereof.

Figure 17:
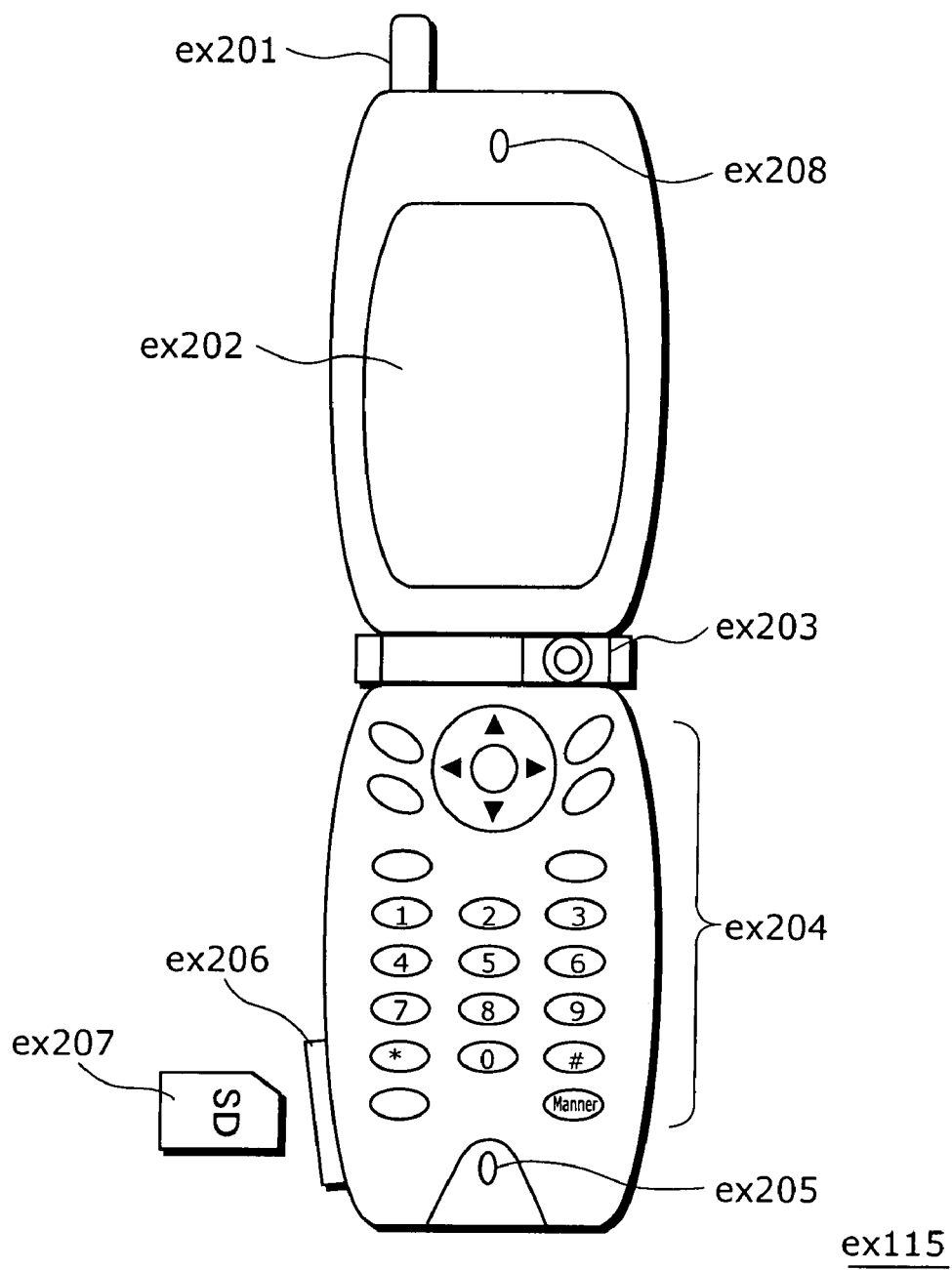
FIG. 17 is a diagram showing a cell phone which uses the image processing method.

FIG. 17 is a diagram showing a cell phone ex115 which uses the image processing method described in the above embodiments and variations. The cell phone ex115 has: an antenna ex201 for communicating radio waves with the base station ex110; a camera unit ex203 such as a CCD camera capable of shooting moving and still pictures; a display unit ex202 such as a liquid crystal display for displaying the data obtained by decoding video shot by the camera unit ex203, video received by the antenna ex201, or the like; a main body including a set of operation keys ex204; a voice output unit ex208 such as a speaker for outputting sounds; a voice input unit ex205 such as a microphone for inputting voices; a recording medium ex207 for storing coded or decoded data, such as data of moving or still pictures shot by the camera, and data of text, moving pictures or still pictures of received e-mails; and a slot unit ex206 for attaching the recording medium ex207 into the cell phone ex115. The recording medium ex207 includes a flash memory element, a kind of Electrically Erasable and Programmable Read Only Memory (EEPROM) that is an electrically rewritable and erasable nonvolatile memory, in a plastic case such as an SD card.

Furthermore, the cell phone ex115 is described with reference to FIG. 18. In the cell phone ex115, a power supply circuit unit ex310, an operation input control unit ex304, a picture coding unit ex312, a camera interface unit ex303, an Liquid Crystal Display (LCD) control unit ex302, a picture decoding unit ex309, a multiplex/demultiplex unit ex308, a record/reproduce unit ex307, a modem circuit unit ex306 and a voice processing unit ex305, are connected with each other via a synchronous bus ex313, and to a main control unit ex311 which controls all of the units in the body including the display unit ex202 and the operation keys ex204.

When a call-end key or a power key is turned ON by a user's operation, the power supply circuit unit ex310 supplies the respective units with power from a battery pack so as to activate the camera-equipped digital cell phone ex115 to a ready state.

In the cell phone ex115, under the control of the main control unit ex311 including a CPU, ROM, RAM and the like, the voice processing unit ex305 converts the voice signals received by the voice input unit ex205 in voice conversation mode into digital voice data, the modem circuit unit ex306 performs spread spectrum processing of the digital voice data, and the communication circuit unit ex301 performs digital-to-analog conversion and frequency transformation of the data, so as to transmit the resulting data via the antenna ex201. Also, in the cell phone ex115, the data received by the antenna ex201 in voice conversation mode is amplified and subjected to the frequency transformation and analog-to-digital conversion, the modem circuit unit ex306 performs inverse spread spectrum processing of the data, and the voice processing unit ex305 converts it into analog voice data, so as to output the resulting data via the voice output unit ex208.

Furthermore, when transmitting an e-mail in data communication mode, the text data of the e-mail inputted by operating the operation keys ex204 of the main body is sent out to the main control unit ex311 via the operation input control unit ex304. After the modem circuit unit ex306 performs spread spectrum processing of the text data and the communication circuit unit ex301 performs a digital-to-analog conversion and frequency transformation on the text data, the main control unit ex311 transmits the data to the base station ex110 via the antenna ex201.

When transmitting image data in data communication mode, the image data shot by the camera unit ex203 is provided to the image coding unit ex312 via the camera interface unit ex303. When the image data is not transmitted, the image data shot by the camera unit ex203 can also be displayed directly on the display unit 202 via the camera interface unit ex303 and the LCD control unit ex302.

The image coding unit ex312 compresses and codes the image data provided from the camera unit ex203 by an image coding method in the image processing devices of the above embodiments and variations so as to convert it into coded image data, and sends it out to the multiplex/demultiplex unit ex308. At this time, the cell phone ex115 sends out the voices received by the voice input unit ex205 during the shooting by the camera unit ex203, as digital voice data, to the multiplex/demultiplex unit ex308 via the voice processing unit ex305.

The multiplex/demultiplex unit ex308 multiplexes the coded image data provided from the image coding unit ex312 and the voice data provided from the voice processing unit ex305, and the modem circuit unit ex306 then performs spread spectrum processing of the multiplexed data obtained as the result of the processing, and the communication circuit unit ex301 performs digital-to-analog conversion and frequency transformation on the resulting data and transmits it via the antenna ex201.

As for receiving data of a moving picture file which is linked to a website or the like in data communication mode, the modem circuit unit ex306 performs inverse spread spectrum processing of the data received from the base station ex510 via the antenna ex201, and sends out the multiplexed data obtained as the result of the processing to the multiplex/demultiplex unit ex308.

In order to decode the multiplexed data received via the antenna ex201, the multiplex/demultiplex unit ex308 demultiplexes the multiplexed data into a coded bit stream of image data and a coded bit stream of voice data, and provides the coded image data to the image decoding unit ex309 and the voice data to the voice processing unit ex305, respectively, via the synchronous bus ex313.

Next, the image decoding unit ex309 decodes the coded bit stream of the image data using a decoding method corresponding to the coding method, so as to generate reproduced moving picture data, and provides this data to the display unit ex202 via the LCD control unit ex302, and thus moving picture data included in a moving picture file linked to a website, for instance, is displayed. At the same time, the voice processing unit ex305 converts the voice data into analog voice data, and provides this data to the voice output unit ex208, and thus voice data included in a moving picture file linked to a website, for instance, is reproduced.

The image processing unit ex314 is a processing unit which has functions of the image processing devices 1 to 3. The image processing unit ex314 performs the resolution increasing processing and the stabilization processing at some stage, for example, prior to coding of the image data, after decoding of the coded image data, or the like.

Figure 19:
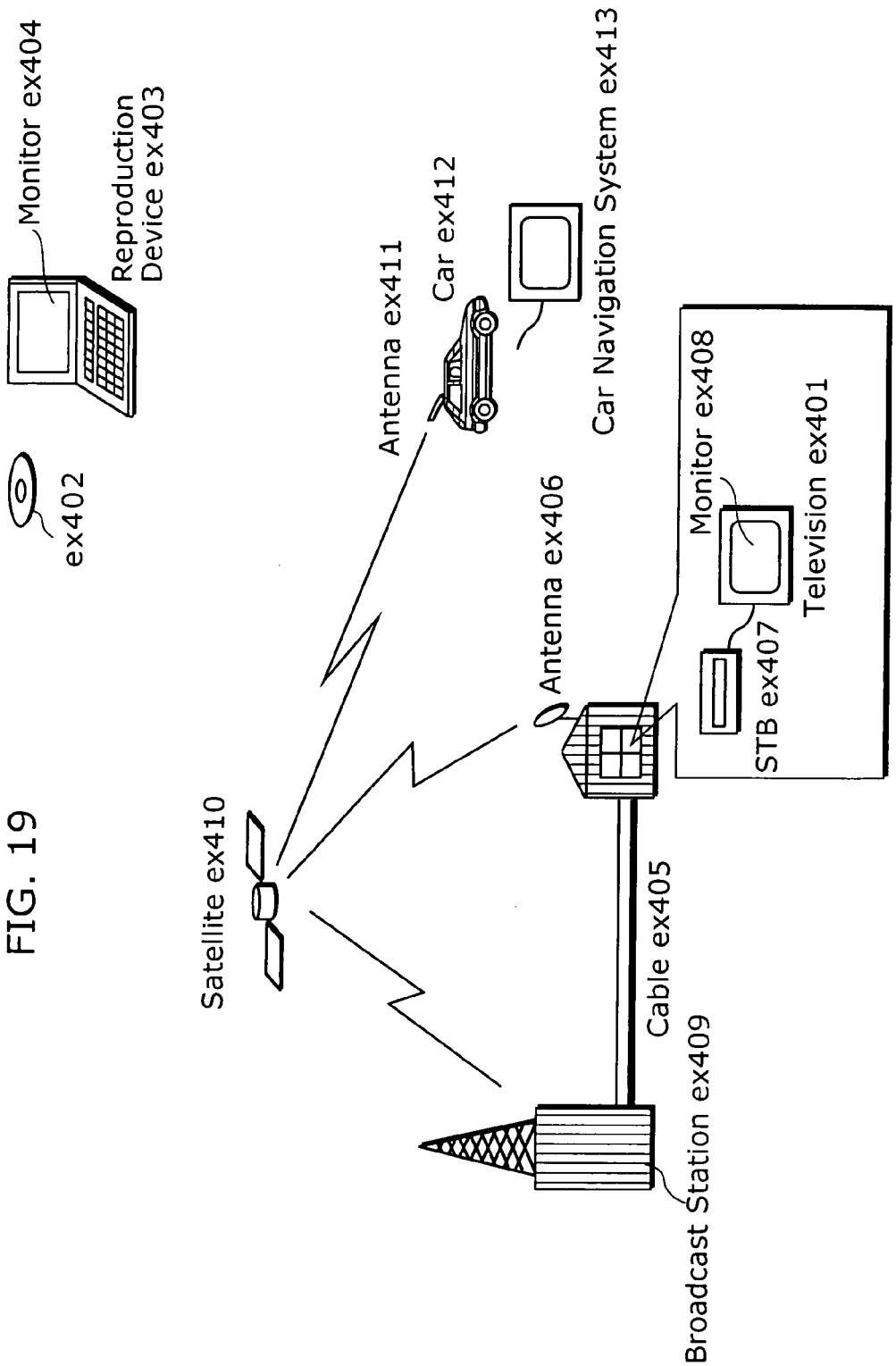
FIG. 19 is a diagram showing an example of a digital broadcasting system.

The present invention is not limited to the above-mentioned system since satellite or terrestrial digital broadcasting has been in the news lately, and at least either the image processing method described in the above embodiments and variations can be incorporated into the digital broadcasting system as shown in FIG. 19. More specifically, a coded bit stream of video information is transmitted from a broadcast station ex409 to a communication or broadcast satellite ex410 via radio waves. Upon receipt of it, the broadcast satellite ex410 transmits radio waves for broadcasting, a home antenna ex406 with a satellite broadcast reception function receives the radio waves, and a device such as a television (receiver) ex401 or a Set Top Box (STB) ex407 decodes the coded bit stream for reproduction. The image processing devices described in the above embodiments and variations can be implemented in a reproduction device ex403 for reading and decoding a coded bit stream recorded on a storage medium ex402 such as a CD and DVD that is a recording medium. In this case, the reproduced video signals are displayed on a monitor ex404. It is also conceived to implement each of the image processing devices in the set top box ex407 connected to a cable ex405 for cable television or the antenna ex406 for satellite and/or terrestrial broadcasting so as to reproduce them on a monitor ex408 of the television. The image processing devices may be incorporated into the television, not in the set top box. Also, a car ex412 having an antenna ex411 can receive signals from the satellite ex410, the base station ex107 or the like, and reproduce moving pictures on a display device such as a car navigation system ex413 or the like in the car ex412.

Furthermore, the image processing devices as described in the above embodiments and variations can code image signals and record them on a recording medium. As a concrete example, there is a recorder ex420 such as a DVD recorder for recording image signals on a DVD disk ex421 and a disk recorder for recording them on a hard disk. They can also be recorded on an SD card ex422. If the recorder ex420 includes one of the image processing devices as described in the above embodiments and variations, the image signals recorded on the DVD disk ex421 or the SD card ex422 can be reproduced for display on a monitor ex408.

Figure 18:
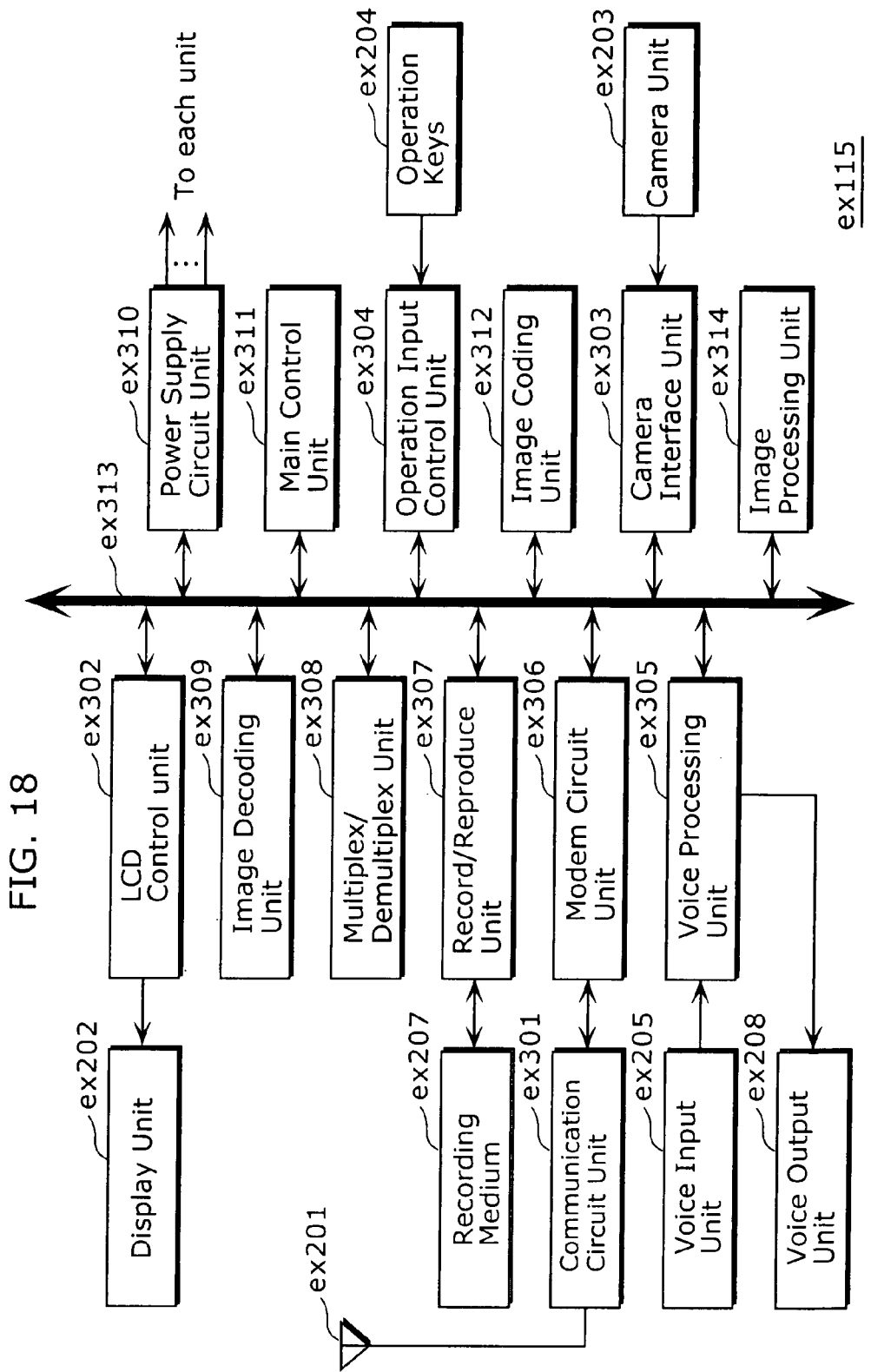
FIG. 18 is a block diagram of the cell phone.

As for the configuration of the car navigation system ex413, a configuration without the camera unit ex203, the camera interface unit ex303 and the image coding unit ex312, out of the units as shown in FIG. 18, is conceivable. The same applies to the computer ex111, the television (receiver) ex401, and others.

Moreover, three types of implementations can be conceived for a terminal such as the above-mentioned cell phone ex114: a communication terminal equipped with both an encoder and a decoder; a sending terminal equipped with an encoder only; and a receiving terminal equipped with a decoder only.

Note also that functional blocks in the block diagrams shown in FIGS. 1, 11, and 13 are implemented into a LSI which is an integrated circuit. These may be integrated separately, or a part or all of them may be integrated into a single chip. (For example, functional blocks except a memory may be integrated into a single chip.) Here, the integrated circuit is referred to as a LSI, but the integrated circuit can be called an IC, a system LSI, a super LSI or an ultra LSI depending on their degrees of integration.

Note also that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

Note also that a central part of the functional blocks shown in FIGS. 1, 11, and 13 and the flowcharts shown in FIGS. 3 and 12 is realized as a processor and a program.

Note that the present invention is not limited to the above embodiments and variations, but various variations and modifications are possible in the embodiments without departing from the scope of the present invention.

INDUSTRIAL APPLICABILITY

The image processing method according to the present invention has advantages of being capable of: (1) realizing the stabilization by mapping the pixel positions of the target picture onto the integrated picture space, based on the stabilized global motion parameter; (2) generating a HR picture in which aliasing in the LR pictures are restored, by combining the LR pictures being shifted with sub-pixel precision with deviation amounts between the pictures; (3) reducing loads on these processing by performing both of the stabilization processing and the resolution increasing processing, uniformly using the same motion vectors. The image processing method is suitable as an image processing method in camera capturing, accumulation, transmission, communication, and the like.

What is claimed is:

1. An image processing method of generating an integrated picture corresponding to a target picture, using the target picture and a plurality of reference pictures, the target picture being one of a plurality of pictures which are sequentially inputted every predetermined period, and the reference pictures being included in the sequentially inputted pictures and being temporally positioned prior or subsequent to the target picture, said image processing method comprising:

estimating a motion amount between a segment of the target picture and a segment of each of the reference pictures with sub-pixel precision;

calculating, by using at least a part of the estimated motion amounts, a global motion parameter which represents dominant motion in the whole target picture, and calculating an in-stabilized variant component based on a history of the global motion parameter;

calculating a stabilized motion amount for the target picture, based on the in-stabilized variant component;

calculating respective stabilized motion amounts for the respective reference pictures, based on the motion amounts and the in-stabilized variant component;

mapping pixels of the reference pictures onto a space for the integrated picture, after shifting the pixels based on the stabilized motion amounts of the reference pictures;

mapping pixels of the target picture onto the space, after shifting the pixels based on the stabilized motion amount of the target picture; and generating, from the pixels of the space, the integrated picture that has pixels whose number is determined using one of a magnification ratio and a predetermined number of pixels, and which are positioned equally spaced apart.

2. The image processing method according to claim 1, wherein the magnification ratio or the predetermined number of pixels is designated from the outside.

3. The image processing method according to claim 1, wherein the magnification ratio or the predetermined number is designated, so that the number of pixels of the integrated picture becomes equal to the number of pixels of the input pictures.

4. The image processing method according to claim 1, further comprising designating a predetermined maximum value of an amount of the shifting, wherein, in said calculating of the in-stabilized variant component, the in-stabilized variant component is calculated so that the amount of the shifting of the pixels do not exceed the maximum value, and in said integrating, the magnification ratio is determined based on the number of pixels of the input pictures and the maximum value.

5. An image processing device which generates an integrated picture corresponding to a target picture, using the target picture and a plurality of reference pictures, the target picture being one of a plurality of pictures which are sequentially inputted every predetermined period, and the reference pictures being included in the sequentially inputted pictures and being temporally positioned prior or subsequent to the target picture, said image processing device comprising:

a motion estimation unit which estimates a motion amount between a segment of the target picture and a segment of each of the reference pictures with sub-pixel precision;

an in-stabilized variant component calculation unit which calculates, by using at least a part of the estimated motion amounts, a global motion parameter which represents dominant motion in the whole target picture, and calculates an in-stabilized variant component based on a history of the global motion parameter;

a first stabilized motion amount calculation unit which calculates a stabilized motion amount for the target picture, based on the in-stabilized variant component;

a second stabilized motion amount calculation unit which calculates respective stabilized motion amounts for the respective reference pictures, based on the motion amounts and the in-stabilized variant component;

a first integration unit which maps pixels of the reference pictures onto a space for the integrated picture, after shifting the pixels based on the stabilized motion amounts of the reference pictures;

a second integration unit which maps pixels of the target picture onto the space, after shifting the pixels based on the stabilized motion amount of the target picture; and an integrated picture processing unit which generates, from the pixels of the space, the integrated picture that has pixels whose number is determined using one of a magnification ratio and a predetermined number of pixels, and which are positioned equally spaced apart.

6. An integrated circuit which generates an integrated picture corresponding to a target picture, using the target picture and a plurality of reference pictures, the target picture being one of a plurality of pictures which are sequentially inputted every predetermined period, and the reference pictures being included in the sequentially inputted pictures and being temporally positioned prior or subsequent to the target picture, said integrated circuit comprising:

a motion estimation unit operable which estimates a motion amount between a segment of the target picture and a segment of each of the reference pictures with sub-pixel precision;

an in-stabilized variant component calculation unit which calculates, by using at least a part of the estimated motion amounts, a global motion parameter which represents dominant motion in the whole target picture, and calculates an in-stabilized variant component based on a history of the global motion parameter;

a first stabilized motion amount calculation unit which calculates a stabilized motion amount for the target picture, based on the in-stabilized variant component;

a second stabilized motion amount calculation unit which calculates respective stabilized motion amounts for the respective reference pictures, based on the motion amounts and the in-stabilized variant component;

a first integration unit which maps pixels of the reference pictures onto a space for the integrated picture, after shifting the pixels based on the stabilized motion amounts of the reference pictures;

a second integration unit which maps pixels of the target picture onto the space, after shifting the pixels based on the stabilized motion amount of the target picture; and an integrated picture processing unit which generates, from the pixels of the space, the integrated picture that has pixels whose number is determined using one of a magnification ratio and a predetermined number of pixels, and which are positioned equally spaced apart.

7. A camera comprising an image processing device which generates an integrated picture corresponding to a target picture, using the target picture and a plurality of reference pictures, the target picture being one of a plurality of pictures which are sequentially inputted every predetermined period, and the reference pictures being included in the sequentially inputted pictures and being temporally positioned prior or subsequent to the target picture, wherein said image processing device includes:

a motion estimation unit operable to estimate a motion amount between a segment of the target picture and a segment of each of the reference pictures with sub-pixel precision;

an in-stabilized variant component calculation unit which calculates, by using at least a part of the estimated motion amounts, a global motion parameter which represents dominant motion in the whole target picture, and calculates an in-stabilized variant component based on a history of the global motion parameter;

a first stabilized motion amount calculation unit which calculates a stabilized motion amount for the target picture, based on the in-stabilized variant component;

a second stabilized motion amount calculation unit which calculates respective stabilized motion amounts for the respective reference pictures, based on the motion amounts and the in-stabilized variant component;

a first integration unit which maps pixels of the reference pictures onto a space for the integrated picture, after shifting the pixels based on the stabilized motion amounts of the reference pictures;

a second integration unit which maps pixels of the target picture onto the space, after shifting the pixels based on the stabilized motion amount of the target picture; and an integrated picture processing unit operable to generate, from the pixels of the space, the integrated picture that has pixels whose number is determined using one of a magnification ratio and a predetermined number of pixels, and which are positioned equally spaced apart.

8. A non-transitory computer-readable medium having a program stored thereon, the program being used to perform a method of generating an integrated picture corresponding to a target picture, using the target picture and a plurality of reference pictures, the target picture being one of a plurality of pictures which are sequentially inputted every predetermined period, and the reference pictures being included in the sequentially inputted pictures and being temporally positioned prior or subsequent to the target picture, said program causing a computer to execute:

estimating a motion amount between a segment of the target picture and a segment of each of the reference pictures with sub-pixel precision;

calculating, by using at least a part of the estimated motion amounts, a global motion parameter which represents dominant motion in the whole target picture, and calculating an in-stabilized variant component based on a history of the global motion parameter;

calculating a stabilized motion amount for the target picture, based on the in-stabilized variant component;

calculating respective stabilized motion amounts for the respective reference pictures, based on the motion amounts and the in-stabilized variant component;

mapping pixels of the reference pictures onto a space for the integrated picture, after shifting the pixels based on the stabilized motion amounts of the reference pictures;

mapping pixels of the target picture onto the space, after shifting the pixels based on the stabilized motion amount of the target picture; and generating, from the pixels of the space, the integrated picture that has pixels whose number is determined using one of a magnification ratio and a predetermined number of pixels, and which are positioned equally spaced apart.

* * * * *